(12) United States Patent
Yae et al.

(10) Patent No.: US 11,044,325 B2
(45) Date of Patent: Jun. 22, 2021

(54) SYSTEM FOR DETERMINING ACTION BASED ON CONTEXT, VEHICLE FOR PERFORMING ACTION DETERMINED BASED ON CONTEXT, AND METHOD OF DETERMINING ACTION BASED ON CONTEXT

(71) Applicants: Hyundai Motor Company, Seoul (KR); Kia Motors Corporation, Seoul (KR)

(72) Inventors: Seong Soo Yae, Gyeonggi-do (KR); Sung Soo Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 287 days.

(21) Appl. No.: 15/805,514

(22) Filed: Nov. 7, 2017

(65) Prior Publication Data

US 2018/0352039 A1 Dec. 6, 2018

(30) Foreign Application Priority Data

May 30, 2017 (KR) .................. 10-2017-0066517

(51) Int. Cl.
*G06F 15/16* (2006.01)
*H04L 29/08* (2006.01)
(Continued)

(52) U.S. Cl.
CPC .............. *H04L 67/16* (2013.01); *G01C 21/00* (2013.01); *G01C 21/34* (2013.01); *G06F 16/955* (2019.01); *H04L 67/18* (2013.01); *H04L 67/32* (2013.01); *H04L 67/325* (2013.01); *H04M 1/72454* (2021.01); *G01S 19/42* (2013.01); *G06F 3/167* (2013.01); *G06F 16/219* (2019.01);
(Continued)

(58) Field of Classification Search
CPC ... H04L 63/08; H04L 63/083; H04L 63/0861; H04L 67/306; H04L 67/18; H04L 67/12; H04L 67/34; H04L 67/42; H04L 67/22; H04L 67/303; H04L 5/001; H04L 5/0053
USPC ........................................ 709/203, 204, 217
See application file for complete search history.

(56) References Cited

U.S. PATENT DOCUMENTS

2012/0250517 A1* 10/2012 Saarimaki ......... H04M 1/72569
370/241
2012/0317106 A1* 12/2012 Akiyama ............ G06F 16/9535
707/730
(Continued)

*Primary Examiner* — Farzana B Huq
(74) *Attorney, Agent, or Firm* — Mintz Levin Cohn Ferris Glovsky and Popeo, P.C.; Peter F. Corless

(57) ABSTRACT

A context-based action determination system includes: a first terminal device; a server device communicably connected with the first terminal device and configured to receive a service provision request from the first terminal device; and a second terminal device, different from the first terminal device, communicably connected with the server device and configured to transmit context information to the server device. The server device determines whether a service associated with the service provision request is providable to the first terminal device in response to the service provision request based on the context information received from the second terminal device, and the server device provides the service to the first terminal device when the server device determines that the service is providable.

16 Claims, 24 Drawing Sheets

(51) Int. Cl.
*G01C 21/34* (2006.01)
*G06F 16/955* (2019.01)
*G01C 21/00* (2006.01)
*H04M 1/72454* (2021.01)
*G06F 3/16* (2006.01)
*G01S 19/42* (2010.01)
*G06F 16/21* (2019.01)
*H04M 1/60* (2006.01)
*H04M 1/72451* (2021.01)
*H04M 1/72457* (2021.01)

(52) U.S. Cl.
CPC ...... *H04M 1/6083* (2013.01); *H04M 1/72451* (2021.01); *H04M 1/72457* (2021.01)

(56) References Cited

U.S. PATENT DOCUMENTS

| | | | |
|---|---|---|---|
| 2013/0185065 A1* | 7/2013 | Tzirkel-Hancock | G10L 15/20 704/233 |
| 2014/0229568 A1* | 8/2014 | Raffa | H04W 4/44 709/217 |
| 2016/0174049 A1* | 6/2016 | Levy | G08G 1/0112 455/456.5 |
| 2017/0123069 A1* | 5/2017 | Kotab | G01C 21/3461 |
| 2017/0323641 A1* | 11/2017 | Shimizu | B60R 16/02 |
| 2018/0077538 A1* | 3/2018 | Matus | H04W 4/023 |

* cited by examiner

FIG. 12

| | INDEX | TARGET TO BE CALLED | CALL MEANS | DATE | TIME | CALLING PLACE | ... |
|---|---|---|---|---|---|---|---|
| | f0 | f11 | f12 | f13 | f14 | f15 | |
| R11→ | 1 | HONG GIL-DONG | MOBILE | 2016/06/21 | 18:30 | AROUND OFFICE | ... |
| R12→ | 2 | WIFE | HOME PHONE | 2016/06/21 | 20:19 | AROUND HOME | ... |
| R13→ | 3 | ASST MANAGER KIM | OFFICE PHONE | 2016/06/09 | 07:34 | AROUND CITY HALL | ... |
| | ⋮ | ⋮ | ⋮ | ⋮ | ⋮ | ⋮ | ⋮ |

| # | RECOMMENDED ACTION | | ACTUAL ACTION |
|---|---|---|---|
| | Action (f31) | RECOMMENDED VALUE (f32) | (f33) |
| 1 (R21) | MOBILE | 89 | MOBILE |
| 2 (R22) | HOME PHONE | 74 | MOBILE |
| ⋮ | ⋮ | ⋮ | ⋮ |

DB3

SYSTEM FOR DETERMINING ACTION BASED ON CONTEXT, VEHICLE FOR PERFORMING ACTION DETERMINED BASED ON CONTEXT, AND METHOD OF DETERMINING ACTION BASED ON CONTEXT

CROSS-REFERENCE TO RELATED APPLICATION

This application claims the benefit of priority to Korean Patent Application No. 10-2017-0066517, filed on May 30, 2017 in the Korean Intellectual Property Office, the disclosure of which is incorporated herein by reference as if fully set forth herein.

BACKGROUND

1. Technical Field

Embodiments of the present disclosure relate generally to vehicular technologies and, more particularly, to a context-based action determination system, a vehicle for performing an action determined based on a context, and a context-based action determination method.

2. Description of the Related Art

Recently, various devices intended to enhance user convenience have been installed in vehicles. Such devices include, for example, an audio-video-navigation (AVN) device, a radio device, or a head unit. Some of these devices allow a user to make outgoing calls to a cell phone or home phone, or to visually and/or audibly acquire desired information, even when a vehicle is running or stopped.

SUMMARY

It is an aspect of the present disclosure to provide a context-based action determination system for determining an appropriate service on the basis of another person's context or determining at least one action included in the service and performing the determined service or action, a vehicle capable of performing the action determined on the basis of the contexts, and a context-based action determination method.

A context-based action determination system includes: a first terminal device; a server device communicably connected with the first terminal device and configured to receive a service provision request from the first terminal device; and a second terminal device, different from the first terminal device, communicably connected with the server device and configured to transmit context information to the server device. The server device determines whether a service associated with the service provision request is providable to the first terminal device in response to the service provision request based on the context information received from the second terminal device, and the server device provides the service to the first terminal device when the server device determines that the service is providable.

The first terminal device may transmit a service provision start request to the server device, and in response to receiving the service provision start request, the server device may determine information needed for the service according to the service provision start request and transmits an approval request to the second terminal device.

The server device may transmit an update request for the context information to the second terminal device.

When the server device determines that the service is not providable, the server device may transmit a guidance message to the first terminal device indicating that the service is not providable.

The second terminal may re-transmit the context information to the server device, and the server device may receive the re-transmitted context information from the second terminal device and re-determine whether the service is providable based on the re-transmitted the context information.

When the server device re-determines that the service is providable, the server device may provide the service to the first terminal device or transmits a guidance message indicating that the service is providable to the first terminal device.

The server device may receive a new service provision request from the first terminal device when the server device determines that the service is not providable.

The server device may transmit an additional information transmission request to the first terminal device, and in response to receiving the additional information transmission request, the first terminal device may transmit additional information indicated by the additional information transmission request to the server device.

When the service includes setting a schedule, the server device may transmit a notification signal to at least one of the first terminal device and the second terminal device when a time according to the schedule has arrived.

The first terminal device may determine a recommended action and a recommendation index corresponding to the recommended action using a context recognition database and the context information, verify the recommended action using a selection history database, and determine a final action according to a result of the verification.

Furthermore, in accordance with embodiments of the present disclosure, a context-based action determination method includes: receiving, at a server device, a service provision request from a first terminal device; receiving, at the server device, context information from a second terminal device different from the first terminal device; determining, by the server device, whether a service associated with the service provision request is providable to the first terminal device in response to the service provision request based on the context information received from the second terminal device; and providing, by the server device, the service to the first terminal device when the server device determines that the service is providable.

The context-based action determination may further include: receiving, at the server device, a service provision start request; determining, by the server device, information needed for the service according to the service provision start request; and transmitting, by the server device, an approval request to the second terminal device.

The context-based action determination method may further include transmitting, by the server device, an update request for the context information to the second terminal device.

The context-based action determination method may further include transmitting, by the server device, a guidance message to the first terminal device indicating that the service is not providable when the server device determines that the service is not providable.

The context-based action determination method may further include: receiving, at the server device, the context information from the second terminal device a second time;

and re-determining, by the server device, whether the service is providable on the basis of the context information received the second time.

The context-based action determination method may further include: providing, by the server device, the service to the first terminal device when the server device re-determines that the service is providable; and transmitting, by the server device, a guidance message to the first terminal device indicating that the service is providable when the server device re-determines that the service is providable.

The context-based action determination method may further include receiving, at the server device, a new service provision request from the first terminal device when the server device determines that the service is not providable.

The context-based action determination method may further include: transmitting, by the server device, an additional information transmission request to the first terminal device; and receiving, by the server device, additional information indicated by the additional information transmission request from the first terminal device.

The context-based action determination method may further include, when the service includes setting a schedule, transmitting, by the server device, a notification signal to at least one of the first terminal device and the second terminal device when a time according to the schedule has arrived.

The context-based action determination method may further include: determining, by the server device, a recommended action and a recommendation index corresponding to the recommended action using a context recognition database and the context information; verifying, by the server device, the recommended action using a selection history database; and determining, by the server device, a final action according to a result of the verification.

Furthermore, in accordance with embodiments of the present disclosure, a vehicle includes: a communicator communicable with an external device; and a processor configured to determine a recommended action and a recommendation index corresponding to the recommended action using a context recognition database and context information, verify the recommended action using a selection history database, and determine a final action according to a result of the verification. The communicator transmits a service provision request associated with the service provision request to the external device and receives information related to the service from the external device in response to the determined final action.

The external device may determine whether the service is providable to the vehicle in response to the service provision request based on context information received from a second terminal device and provides the service to the vehicle when the external device determines that the service is providable.

BRIEF DESCRIPTION OF THE DRAWINGS

These and/or other aspects of the disclosure will become apparent and more readily appreciated from the following description of the embodiments, taken in conjunction with the accompanying drawings briefly described below.

FIG. 12 is a diagram showing an example of a context recognition database corresponding to a phone call originating action.

FIG. 13 is a diagram showing an example of a selection history database and a use history database associated with a phone call originating action.

Figure 1:
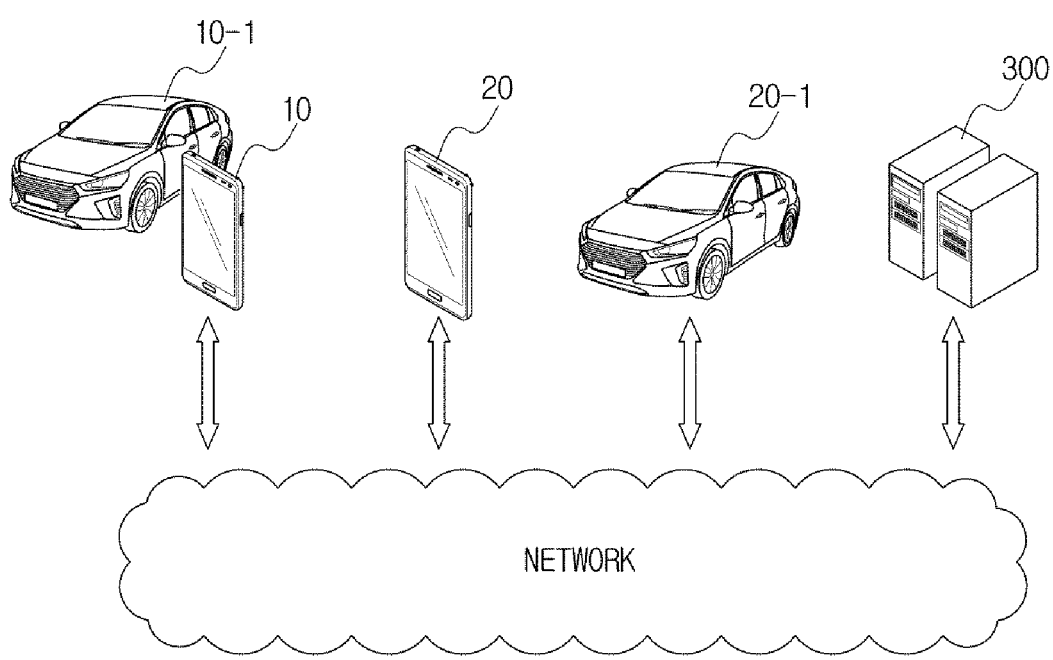
FIG. 1 is a schematic diagram of an example of a context-based action determination system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a context-based action determination system, at least one terminal device, at least one vehicle, and a computing device for performing a server function (hereinafter referred to as a "server device"), according to embodiments of the present disclosure, will be described below with reference to FIGS. 1 to 10.

Figure 2:
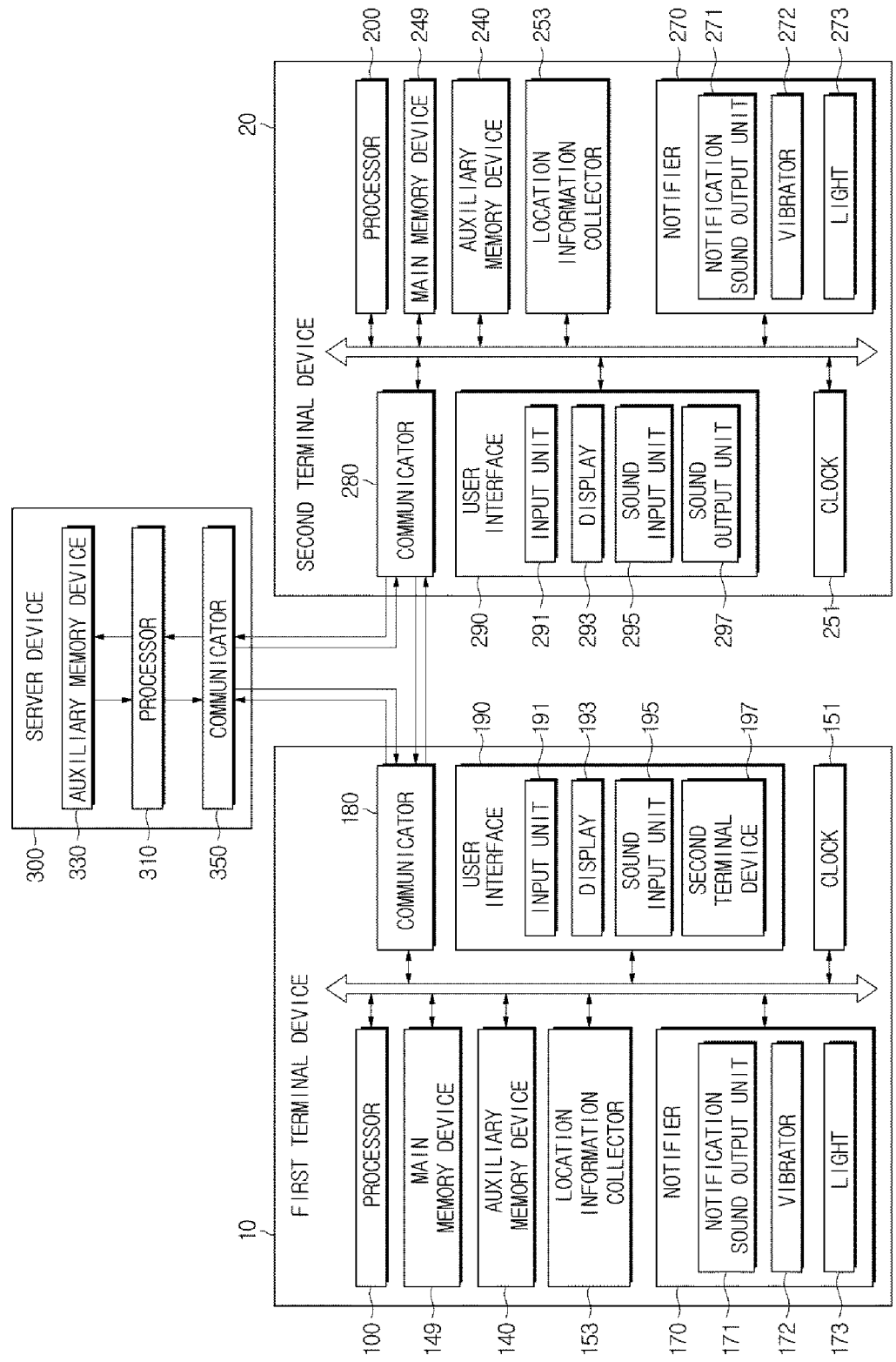
FIG. 2 is a block diagram of a context-based action determination system.

FIG. 1 is a schematic diagram of an example of a context-based action determination system, and FIG. 2 is a block diagram of a context-based action determination system.

Referring first to FIG. 1, a context-based action determination system 1 may include a plurality of terminal devices 10, 10-1, 20, and 20-1 and a server device 300, which are configured to communicate with each other over a predetermined communication network. The predetermined communication network may include a wired communication network, a wireless communication network, and a wired/wireless communication network.

The wired communication network is provided for the plurality of terminal devices 10, 10-1, 20, and 20-1 and the server device 300 to communicate with each other using a cable. The cable may include, for example, a pair cable, a coaxial cable, an optical fiber cable, or an Ethernet cable.

The wireless communication network may include at least one a short-range communication network and a mobile communication network. The short-range communication network may be implemented using a short-range communication technique. The short-range communication technique refers to a technique provided to enable communication between devices located at a short distance from each other and may be implemented using a predetermined short-range communication standard considerable by a designer, for example, Bluetooth, Bluetooth Low Energy, CAN, Wi-Fi, Wi-Fi Direct, Wi-MAX, ultra wideband (UWB), Zigbee, Infrared Data Association (IrDA), or Near Field Communication (NFC). The wireless communication technique may be provided to enable communication between devices located at a short or long distance from each other and may be implemented using a predetermined mobile communication standard considerable by a designer, for example, a mobile communication standard such as 3GPP, 3GPP2, or WiMax series. Examples of the mobile communication standard may include Global System for Mobile Communication (GSM), Enhanced Data GSM Environment (EDGE), Wideband Code Division Multiple Access (WCDMA), Code Division Multiple Access (CDMA), Time Division Multiple Access (TDMA), or the like.

The wired/wireless communication network may be implemented through a combination of a wired communication network and a wireless communication network.

Each of the plurality of terminal devices 10, 10-1, 20, and 20-1 may receive a command or data from a user and/or collect various kinds of context information as necessary.

The context information includes information relevant to present, past, and future contexts of the terminal devices 10, 10-1, 20, and 20-1 or present, past, and future contexts of users of the terminal devices 10, 10-1, 20, and 20-1. For example, the context information may include information indicating that a schedule of a specific user at a specific time is already set for each of terminal devices 10, 10-1, 20, and 20-1 or the server device 300, information indicating that notification sound output units 171 and 271 of the terminal devices 10, 10-1, 20, and 20-1 are set to be silent, information indicating that locations of the terminal devices 10, 10-1, 20, and 20-1 correspond to predetermined locations, and/or information indicating that the terminal devices 10, 10-1, 20, and 20-1 correspond to settings predefined by users or a designer. Also, each of the plurality of terminal devices 10, 10-1, 20, and 20-1 may transmit at least one of the command or data received from a user and the collected context information to the server device 300 and may receive various kinds of information, commands, or the like from the server device 300.

Examples of the terminal devices 10, 10-1, 20, and 20-1 may include a cellular phone, a smartphone, a tablet PC, a desktop computer, a laptop computer, a navigation device, a home game console, a portable game console, a personal digital assistant (PDA), a wearable device such as smart glasses, a smart ring, or a smart watch, a vehicle 10-1 or 20-1, a machine device, various kinds of robots or robot cleaners, and home appliances such as a television, a refrigerator, or a washing machine. In addition, the terminal devices 10, 10-1, 20, and 20-1 may be implemented using various devices according to preferences of a designer, as would be understood to a person possessing an ordinary level of skill in the art.

The terminal devices 10, 10-1, 20, and 20-1 may be the same kind of terminal devices or different kinds of terminal devices. For example, the terminal device 10 (hereinafter referred to as a "first terminal device") may be a smartphone, the terminal device 20 may be a smartphone (hereinafter referred to as a "second terminal device"), and the terminal device 20-1 may be a vehicle (hereinafter referred to as a "third terminal device").

According to embodiments of the present disclosure, the terminal device 10-1 (hereinafter referred to as a "fourth terminal device") may be paired with the terminal device 10 to communicate with the server device 300 or the other devices 10, 20, and 20-1. For example, the fourth terminal device 10-1 is a vehicle, and the vehicle may be paired with the first terminal device 10 using a Bluetooth communication standard to communicate with at least one of the server device 300, the second terminal device 20, and the third terminal device 20-1 through the first terminal device 10.

When the terminal devices 10-1 and 20-1 are vehicles, the vehicles may access a communication network through Bluetooth pairing with the terminal device 10 as described above or may directly access a communication network by means of a communication module installed therein.

For convenience of description, the context-based action determination system 1 will be described as an example including the first terminal device 10 and the second terminal device 20. As described above, it will be obvious that the context-based action determination system 1 may include a larger number of homogeneous or heterogeneous terminal devices, such as the third terminal device 20-1 and the fourth terminal device 10-1, in addition to the first terminal device 10 and the second terminal device 20.

Referring next to FIG. 2, the first terminal device 10 may include a processor 100, an auxiliary memory device 140, a main memory device 149, a communicator 180, and a user interface 190. Also, according to embodiments of the present disclosure, the first terminal device 10 may further include at least one a clock 151, a location information collector 153, and a notifier 170.

At least two of the processor 100, the auxiliary memory device 140, the main memory device 149, the clock 151, the location information collector 153, the notifier 170, the communicator 180, and the user interface 190 may be configured to transmit and receive data to and from each other using at least one of a circuit, a cable, and a wireless communication network. Examples of the wireless communication network may include Bluetooth, WiFi, WiFi Direct, and/or CAN.

The processor 100 is configured to perform various calculations and processes needed to operate the first terminal device 10, transmit a control signal to each component of the first terminal device 10, and control overall operation of the first terminal device 10.

According to embodiments of the present disclosure, the processor 100 may include at least one of a central processing unit (CPU), a micro controller unit (MCU), and an electronic control unit (ECU). The CPU, the MCU, and the ECU may be implemented using at least one semiconductor chip, substrate, and relevant components.

The processor 100 may be programmed in advance to perform a specific action and/or configured to drive a predetermined algorithm stored in the main memory device 149 or the auxiliary memory device 140 or a program product including the predetermined algorithm in order to perform a specific action. Here, the program product may be referred to as, for example, an application. For example, the application may be provided from a separate external server device for providing applications.

According to embodiments of the present disclosure, when a user inputs a service provision start command or a service provision command through an input unit 191, the processor 100 may control the communicator 180 in response to the input service provision start command or service provision command and transmit a signal corresponding to the service provision start command or the service provision command to the server device 300.

A service may include a set or scenario of actions performed by at least one of the terminal devices 10, 10-1, 20, and 20-1 and the server device 300 included in the context-based action determination system 1. By performing such a series of actions, the users of the terminal devices 10, 10-1, 20, and 20-1 may receive information and/or perform a desired action. A service may include, for example, a call connection service, a message transmission service, a data sharing service such as image data or music data, a schedule sharing service, a schedule setting service, and/or a destination sharing service.

Also, the processor 100 may acquire context information and may control the communicator 180 to transmit the acquired context information to the server device 300 periodically, at any time, or when a context information update request is received from the server device 300. The context information may be acquired on the basis of an electric signal transferred from, for example, the clock 151, the location information collector 153, the communicator 180, and/or the user interface 190.

In another example, the processor 100 may control the communicator 180 such that the first terminal device 10 may perform a call action with the second terminal device 20.

Also, the processor 100 may determine whether a predefined time, for example, a time estimated on a schedule or a time separately defined before the estimated time has arrived by using information regarding a current time transferred from the clock 151 and may control the notifier 170 on the basis of a result of the determination.

Also, the processor 100 may enable the first terminal device 10 to perform a setting action for a destination, perform a calculation action for a required travel time or a distance between a current location and a destination, and/or a guidance action for a route to a destination. When it is determined that a user departs to a destination, the processor 100 may create information regarding the departure to the destination using information input by the user or a movement route of the first terminal device 10 and may control the communicator 180 to transmit the created information to the server device 300 and/or the second terminal device 20.

In addition, the processor 100 may perform at least one action considerable by a designer through various kinds of calculation and control actions.

The auxiliary memory device 140 may store various kinds of information associated with actions of the first terminal device 10. The auxiliary memory device 140 may be implemented using at least one storage medium configured to permanently or semi-permanently store data, such as a flash memory device, a secure digital (SD) card, a solid state drive (SSD), a hard disk drive (HDD), a magnetic drum, a compact disc, a laser disc, a magnetic tape, a magneto-optical disk, and/or a floppy disk.

The main memory device 149 may temporarily or non-temporarily store at least one of data, an algorithm, and a program product that are needed to operate the processor 100. For example, the main memory device 149 may enable the processor 100 to quickly perform a necessary action by temporarily or non-temporarily storing an algorithm or a program product that is called from the auxiliary memory device 140 and providing the algorithm or the program product to the processor 100 in response to a call by the processor 100. The main memory device 149 may be implemented using a semiconductor storage medium such as a read only memory (ROM) and/or a random access memory (RAM). Examples of the ROM may include a typical ROM, an erasable programmable ROM (EPROM), an electrically erasable programmable ROM (EEPROM), and/or a mask ROM. Examples of the RAM may include a dynamic RAM (DRAM) and/or a static RAM (SRAM).

The clock 151 may acquire information regarding a current time. The acquired time information may be transferred to at least one of the processor 100 and the auxiliary memory device 140 in the form of an electric signal.

The location information collector 153 may receive, measure, or determine information regarding a current location (hereinafter referred to as "location information") of the first terminal device 10 and may transfer the received, measured, or determined location information to the processor 100. Examples of the location information may include latitude and longitude, Global Positioning System (GPS) coordinates, an address or road name determined using coordinates of the current location, or a destination of a specific region determined using coordinates of the current location. The destination of the specific region may be defined by a user and may include, for example, words such as a house or a company.

The location information collector 153 may acquire location information using, for example, a Global Navigation Satellite System (GNSS). Here, the GNSS may include at least one of several navigation systems for calculating a location of a receiving terminal using radio signals received from an artificial satellite. For example, the GNSS may include navigation systems such as GPS, Galileo, Global Orbiting Navigational Satellite System (GLONASS), COMPASS, Indian Regional Navigational Satellite System (IRNSS), and/or Quasi-Zenith Satellite System (QZSS).

According to embodiments of the present disclosure, the first terminal device 10 may further include various devices for acquiring information regarding a surrounding context. For example, the first terminal device 10 may further include an illumination sensor capable of detecting the amount of ambient light, a heart rate detection sensor capable of detecting a heart rate of a user, a noise sensor capable of measuring ambient noise, a thermometer capable of measuring temperature of a user, or at least one of various devices considerable by a designer.

The notifier 170 may output a notification signal in the form of light, sound, vibration, etc. according to a previous definition and may provide the notification signal to a user. The notifier 170 may include, for example, at least one of the notification sound output unit 171, a vibrator 172, and a light 173.

The notification sound output unit 171 may be configured to output a notification signal as predetermined sound and implemented using, for example, a speaker device. The notification sound output unit 171 may be excluded. In this case, a sound output unit 197 may perform a function of the notification sound output unit 171.

The vibrator 172 may vibrate the first terminal device 10 so that the first terminal device 10 outputs a notification signal in the form of vibration. For example, the vibrator 172 may be implemented by means of a motor having a rotary shaft member rotating around a predetermined rotation shaft and at least one weight installed apart from the rotation shaft of the motor.

The light 173 may provide a notification signal to a user by emitting light. The light 173 may be implemented using a filament bulb or a light emitting diode (LED).

The user may set the first terminal device 10 so that only at least one of the notification sound output unit 171, the vibrator 172, and the light 173 of the notifier 170 may selectively operate, and thus the first terminal device 10 may set at least one of a sound mode (e.g., a sound output mode), a vibration mode, and a silent mode.

The communicator 180 may be configured to communicate with at least one communicator 280 or 350 of at least one of the second terminal device 20 and the server device 300 over at least one of a wired communication network and a wireless communication network.

The first terminal device 10 may receive at least one command, request, or data, for example, various kinds of messages from at least one of the second terminal device 20 and the server device 300 through the communicator 180 or may transmit at least one command or request, for example, a service provision request signal or data to at least one of the second terminal device 20 and the server device 300.

As necessary, the communicator 180 may communicably connect the first terminal device 10 with the vehicle 10-1 so that the first terminal device 10 and the vehicle 10-1 may be paired with each other.

The communicator 180 may be implemented using at least one of a short-range communication module and a mobile communication module. The short-range communication module may be configured to communicate with external devices 10-1, 20, and 300 using the above-described short-range communication technique (standard), and the mobile communication module may be configured to communicate with external devices 20 and 300 using the above-described mobile communication technique (e.g., standard).

The user interface 190 is configured to receive at least one command from a user and/or visually or audibly provide various kinds of information to the user through communication with the user.

According to embodiments of the present disclosure, the user interface 190 may include at least one of the input unit 191, a display 193, a sound input unit 195, and a sound output unit 197. At least one of the input unit 191, the display 193, the sound input unit 195, and the sound output unit 197 may be excluded depending on selection of a designer.

The display 193 may visually provide at least one piece of information to a user using various numbers, symbols, letters, figures and/or shapes. For example, the display 193 may display a call disallowance guidance message, a call allowance message, a schedule setting allowance message, a schedule setting completion message, and/or other messages needed to provide services, which are received from the server device 300.

The display 193 may be implemented using, for example, a plasma display panel (PDP), a light emitting diode (LED) panel, or a liquid crystal display (LCD). Here, the LED panel may include an organic light emitting diode (OLED) or the like. The OLED may include a passive matrix OLED (PMOLED) or an active matrix OLED (AMOLED).

The input unit 191 may receive a command, a request, or data from a user. For example, the input unit 191 may receive a service provision request, a service provision start request, a call origination command, a schedule setting command, or at least one command inputtable by a user and output an electric signal corresponding to the received command. The output electric signal may be transferred to the processor 100.

Examples of the input unit 191 may include a physical button, a knob, a trackball, a track pad, a touch pad, a touch screen, a joystick, and/or an action detecting sensor. Here, the touch screen may perform both functions of the input unit 191 and the display 193. In addition, at least one of various input devices considerable by a designer to input data or a command may be employed as the input unit 191.

The sound input unit 195 may receive sound waves from the outside, convert the received sound waves into an electric signal, and output the electric signal corresponding to the received sound waves. The sound waves received by the sound input unit 195 may include a voice generated by a user's utterance. For example, the sound input unit 195 may be implemented by means of a microphone.

The electric signal output by the sound input unit 195 may be transferred to the processor 100. The processor 100 may perform voice recognition using the received electric signal and perform a predetermined action according to a result of the voice recognition.

The sound output unit 197 is provided to output sounds including a voice or the like. For example, the sound output unit 197 may be implemented by means of at least one speaker device configured to covert an electric signal to sound waves or by means of an ear phone, a head phone, or the like.

The voice received by the sound input unit 195 may be transmitted to at least one of the server device 300 and the second terminal device 20 by means of the communicator 180. The sound output unit 197 may output the voice received from at least one of the server device 300 and the second terminal device 20 to the outside. Thus, the user may make a voice call with the second terminal device 20 by means of the first terminal device 10.

As shown in FIG. 2, according to an embodiment, the second terminal device 20 may include a processor 200, an auxiliary memory device 240, a main memory device 249, a communicator 280, and a user interface 290. Also, according to an embodiment, the second terminal device 20 may further include at least one of a clock 251, a location information collector 253, and a notifier 270. Here, the notifier 270 may include at least one of a notification sound output unit 271, a vibrator 272, and a light 273, and the user interface 290 may include an input unit 291, a display 293, a sound input unit 295, and a sound output unit 297.

The processor 200, the auxiliary memory device 240, the main memory device 249, the clock 251, the location information collector 253, the notifier 270, the communicator 280, and the user interface 290 of the second terminal device 20 may perform substantially the same functions as those of the processor 100, the auxiliary memory device 140, the main memory device 149, the clock 151, the location information collector 153, the notifier 170, the communicator 180, and the user interface 190 of the first terminal device 10 or may perform partially modified functions. Hereinafter, in order to avoid repetition of description, detailed descriptions of structures, actions, and functions of the processor 200, the auxiliary memory device 240, the main memory device 249, the clock 251, the location information collector 253, the notifier 270, the communicator 280, and the user interface 290 of the second terminal device 20 will be omitted.

The server device 300 may receive a command, a request, data, or the like from the terminal devices 10 and 20 in the form of a signal, perform an action corresponding to a service in response to the received command, request, data, or the like, and transmit a command, a request, data, or the like according to a result of performing the action to the terminal devices 10 and 20.

For example, the server device 300 may include a computer device provided to perform a server function. In this case, the server device 300 may be implemented using, for example, a laptop computer, a notebook computer, and/or a network attached storage (NAS). Alternatively, according to an embodiment, the server device 300 may be implemented using a cellular phone, a smartphone, a tablet PC, a home or portable game console, a wearable device, a vehicle, a machinery device, various kinds of robots or home appliances, etc.

According to embodiments of the present disclosure, the server device 300 may include a processor 310, an auxiliary memory device 330, and a communicator 350.

The processor 310 may determine various kinds of actions needed for the server device 300 through calculations and processes or control overall operation of the server device 300. For example, the processor 310 may be implemented using a central processing unit, a microcontroller unit, or an electronic control device.

According to embodiments of the present disclosure, the processor 310 may also determine whether a service is available on the basis of context information transmitted by at least one of the plurality of terminal devices 10 and 20 and determine whether the service is providable on the basis of a result of the determination. Also, according to the determination result, the processor 310 may control the communicator 350 to transmit predetermined data to at least one of the terminal devices 10 and 20.

In addition, when a request is transmitted from any one terminal device, for example, the first terminal device 10, the processor 310 may create a request signal corresponding to the transmitted request and transmit the created request signal to another terminal device, for example, the second terminal device 20. The processor 310 may receive a response signal transmitted from the second terminal device 20 in response to the request signal and determine a subsequent action to be performed on the basis of the response signal.

Also, the processor 310 may relay a voice call, a message, or various kinds of data that is sent between the first terminal device 10 and the second terminal device 20.

Also, the processor 310 may transmit a predetermined request signal, for example, a context information update request signal to at least one of the plurality of terminal devices 10 and 20 and may enable the plurality of terminal devices 10 and 20 to transmit information corresponding to the request signal, for example, context information.

Furthermore, the processor 310 may temporarily or non-temporarily store data transmitted from at least one of the plurality of terminal devices 10 and 20 in the auxiliary memory device 330.

In addition, the processor 310 may be set or designed to perform various actions considerable by a designer.

The auxiliary memory device 330 may store various kinds of information needed to operate the server device 300. For example, the auxiliary memory device 330 may include a main memory device and an auxiliary memory device. The main memory device may be implemented using a random access memory (RAM) or a read only memory (ROM), and the auxiliary memory device may be implemented using a typical storage medium, such as a semiconductor storage device, a magnetic disk storage device, a magnetic drum storage device, or a compact disk.

The auxiliary memory device 330 may store various kinds of information needed to perform services. For example, the auxiliary memory device 330 may store various kinds of information needed to implement services, a schedule requested by a user of any one of the terminal devices 10 and 20, multimedia content, such as video or music, which is transmitted from any one of the terminal devices 10 and 20, and/or a history of calls between the plurality of terminal devices 10 and 20.

The communicator 350 is provided to communicate with at least one of the first terminal device 10 and the second terminal device 20. The communicator 350 may receive at least one of various kinds of commands, requests, and data from at least one of the first terminal device 10 and the second terminal device 20 and may transfer at least one of the received commands, requests, and data to at least one of the processor 310 and the auxiliary memory device 330.

The communicator 350 may access at least one of the above-described wired communication networks, wireless communication networks, and wired/wireless communication networks to communicate with external terminal devices 10 and 20.

An entire service flow performed by a context-based action determination system will be described below with reference to FIGS. 3 to 10.

Figure 3:
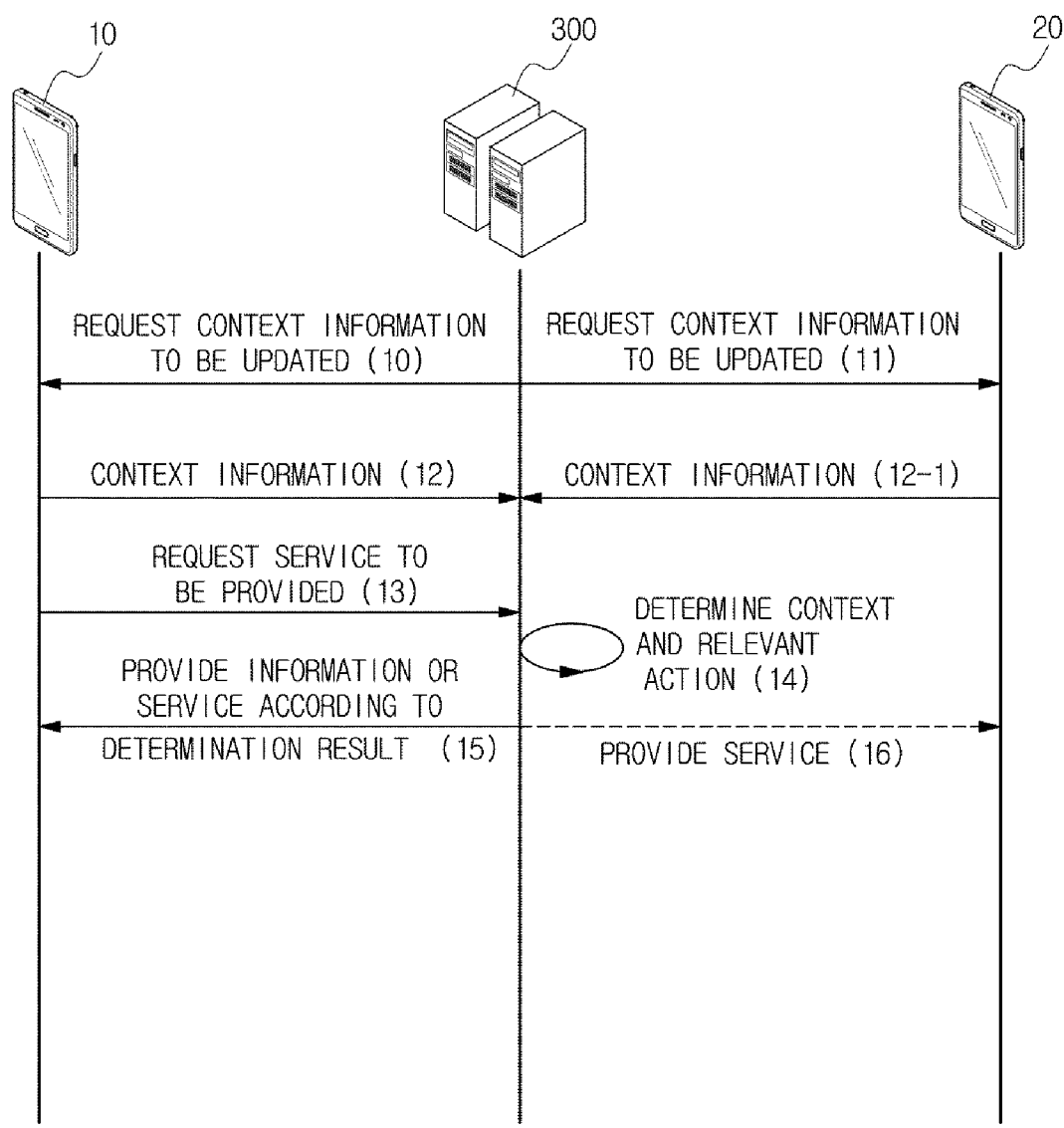
FIG. 3 is a diagram illustrating an entire operational flow of a context-based action determination system.

FIG. 3 is a diagram illustrating an entire operational flow of a context-based action determination system.

As shown in FIG. 3, the server device 300 may transmit a context information update request signal to at least one of the first terminal device 10 and the second terminal device 20 (10 and 11).

The transmission of a context information update request signal (10 and 11) may be performed periodically or aperiodically (i.e., at any given time) or may be performed only when a specific condition is satisfied. For example, the transmission of a context information update request signal (10 and 11) may be performed periodically or aperiodically only after a service starts to be provided.

In response to the reception of the context information update request signal (10 and 11), the at least one of the first terminal device 10 and the second terminal device 20 may transmit context information to the server device 300 (12 and 12-1). Here, the context information may be input or acquired, for example, using the auxiliary memory device 140, the main memory device 149, the clock 151, the location information collector 153, the user interface 190, or a sensor for detecting a state or context of a user or his/her surroundings.

Subsequently, the first terminal device 10 may transmit a service provision request signal to the server device 300 by means of the communicator 180. In this case, the first terminal device 10 may transmit a service provision request signal to the server device 300 by using a predetermined trigger.

According to embodiments of the present disclosure, an action of manipulating the input unit 191 of the first terminal device 10 or an input of a voice through the sound input unit 195 may be used as a trigger. For example, when a user manipulates the input unit 191 of the first terminal device 10 to input a service provision request command, the first terminal device 10 may create a service provision request signal corresponding to the service provision request command in response to the input of the command.

Alternatively, as described below, an action of determining a final action may also be used as a trigger for transmitting a service provision request signal.

Furthermore, various actions according to preferences of a designer may be used as the above-described trigger.

The server device 300 may determine a context on the basis of at least context information that is stored in the auxiliary memory device 330 and associated with the second terminal device 20 or a user of the second terminal device 20 and may determine whether a service is available on the basis of a result of the determination and determine an action corresponding to the service to be performed by the server device 300 (14). Here, the context may be associated with the user of the second terminal device 20. Also, as necessary, the server device 300 may further determine an action to be performed by the first terminal device 10 in addition to the action to be performed by the server device 300. Also, the server device 300 may further determine an action to be performed by the server device 300 depending on a case in which a service is available and a case in which a service is unavailable.

Also, according to embodiments of the present disclosure, the server device 300 may determine the context by additionally using context information associated with the first terminal device 10 or a user of the first terminal device 10.

When a service is available and an action needed to provide the service is determined by the server device 300, the server device 300 may provide the service to at least one of the user of the first terminal device 10 and the user of the second terminal device 20 (15). For example, the server device 300 may provide information needed to provide the service to at least one of the first terminal device 10 and the second terminal device 20.

In some instances, the server device 300 may transmit a result of the determination to the first terminal device 10. In detail, the server device 300 may transfer information regarding at least one of the determined context and the corresponding determination result to the first terminal device 10.

For example, when a service is unavailable, the server device 300 may transmit a guidance message indicating that the service is unavailable. The guidance message indicating that the service is unavailable may include, for example, information regarding a fact that the service is unavailable and reasons why the service is unavailable.

Thus, the user of the first terminal device 10 may check the determination result of the server device 300 with respect to the service provision request and may take an appropriate action corresponding to the result.

In FIG. 3, only the first terminal device 10 and the second terminal device 20 are shown. However, as described above, even when a larger number of terminal devices such as the third terminal device 20-1 and the fourth terminal device 10-1 other than the first terminal device 10 and the second terminal device 20 are connected to the server device 300, the above-described service request process, context determination process, and service provision process may be applied with no change or partial modification.

Various embodiments of the service provision process by the context-based action determination system shown in FIG. 3 will be described below.

Figure 4:
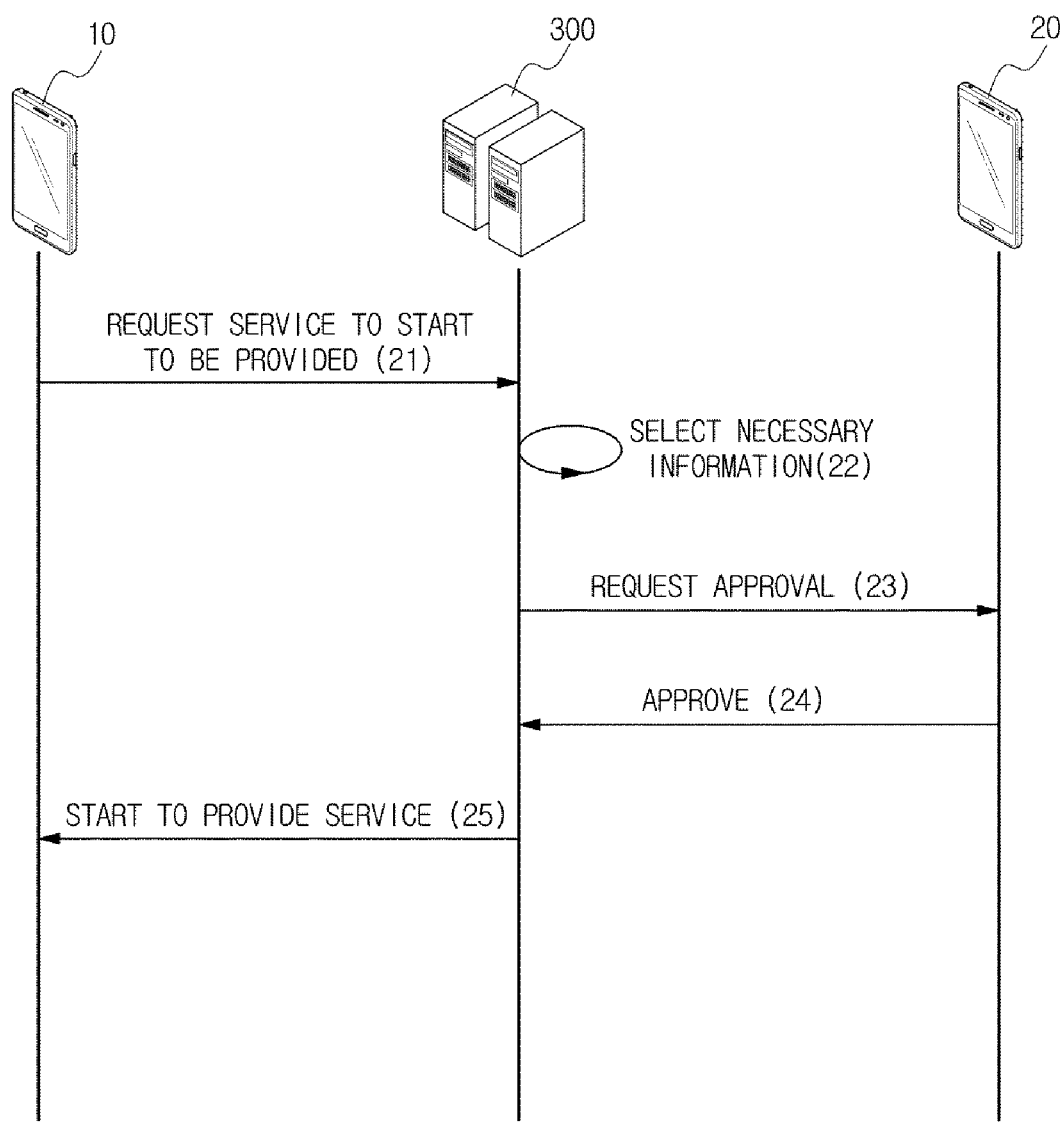
FIG. 4 is a diagram illustrating an approval process for another user in a context-based action determination system.
Figure 5:
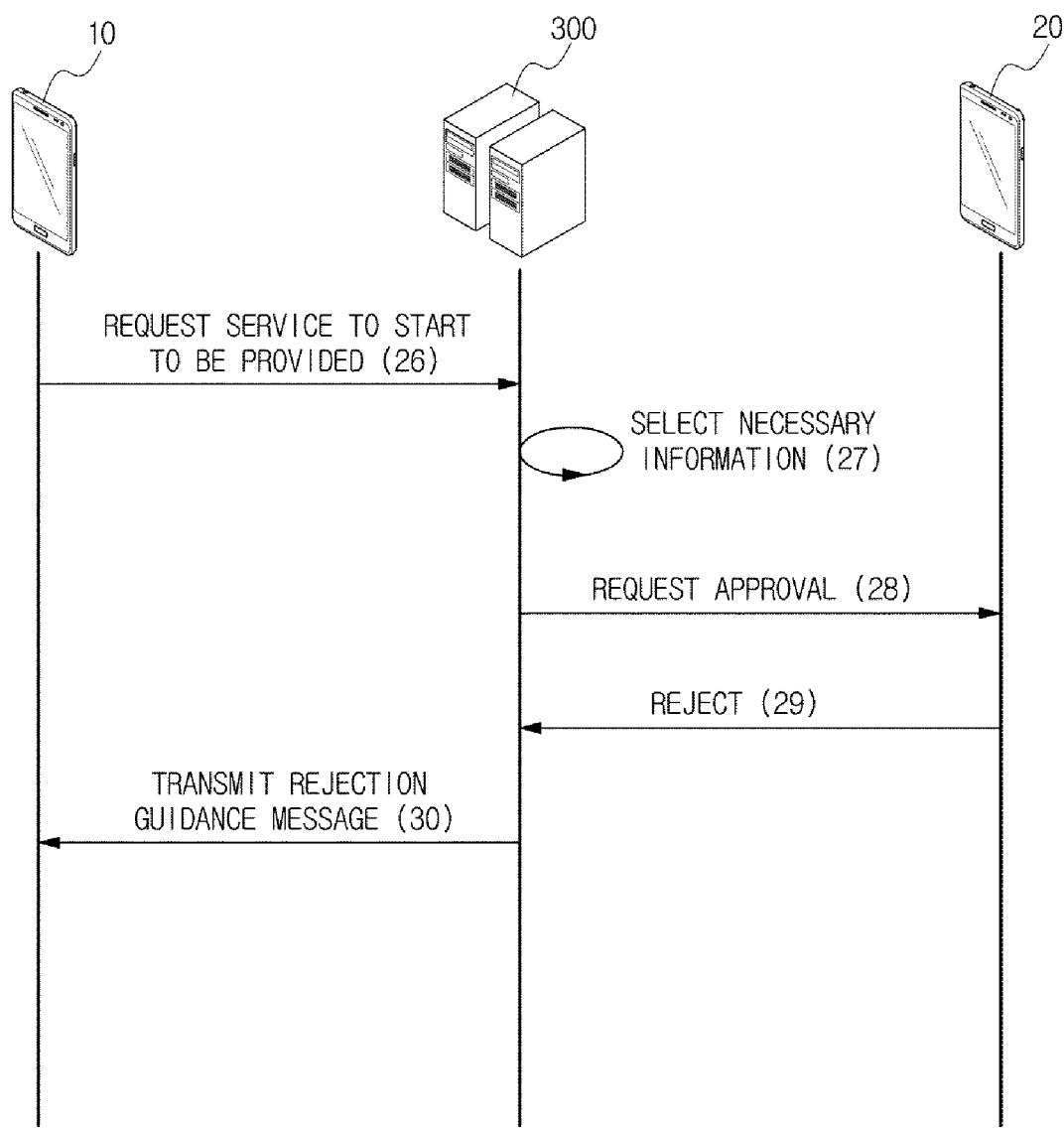
FIG. 5 is a diagram illustrating a rejection process for another user in a context-based action detection system.

FIG. 4 is a diagram illustrating an approval process for another user in a context-based action determination system, and FIG. 5 is a diagram illustrating a rejection process for another user in a context-based action detection system.

According to embodiments of the present disclosure, the server device 300 may provide the above-described service to a plurality of terminal devices 10 and 20 only when the server device 300 receives an agreement from users of the plurality of terminal devices 10 and 20. In other words, when a user of the first terminal device 10 requires a user of the second terminal device 20 to participate in a service, the server device 300 may determine a context of the second terminal device 20 or provide the service to the second terminal device 20 only when there is agreement or approval from the user of the second terminal device 20.

In detail, referring to FIG. 4, the user of the first terminal device 10 inputs a command for first starting at least one service, for example, a phone call service or a schedule setting service (hereinafter referred to as a "service provision start command"), and the first terminal device 10 may create a service provision start request signal in response to the service provision start command and then transmit the created service provision start request signal to the server device 300 (21).

The service provision start command may include information regarding a user of a terminal device whom the user of the first terminal device 10 wants to participate in service provision, for example, the user of the second terminal device 20.

In response to reception of the service provision start request signal, the server device 300 may select information required for the service requested by the user (22). The service-required information includes information to be acquired from at least one of the first terminal device 10 and the second terminal device 20 in order to perform the service. For example, when the service is a call connection service, the service-required information may include, for example, a phone number of the second terminal device 20, a setting state of the notifier 270, whether the second terminal device 20 is busy, a location of the second terminal device 20, a schedule stored in the auxiliary memory device 240 of the second terminal device 20, and/or various other information considerable by a designer.

The server device 300 may transmit an approval request signal to the second terminal device 20 according to a user requirement or settings of the first terminal device 10 (23). Also, the server device 300 may transmit the service-required information to the second terminal device 20 in addition to the approval request signal and requests that the second terminal device 20 transmit information corresponding to the service-required information.

In response to the approval request signal, the user of the second terminal device 20 may input an approval command by means of the input unit 291 or the sound input unit 295 of the user interface 290. According to the input approval command, the second terminal device 20 transmits a signal corresponding to approval to the server device 300 (24).

In response to the reception of the signal corresponding to the approval, the server device 300 may transmit a signal indicating that the service may be provided to the first terminal device 10 (25). Thus, the server device 300 may notify the user of the first terminal device 10 that the service may start to be provided on the basis of the context of at least one of the second terminal device 20 and the user of the second terminal device 20.

To this end, the server device 300 may transmit a service provision start guidance message to the first terminal device 10 and notify the user that the service is providable. In this case, the service provision start guidance message may be transmitted to the first terminal device 10 by using, for example, short message service (SMS), multimedia message service (MMS), email, instant messaging, or other appropriate text or image transmission methods. Also, the service provision start guidance message may be transmitted to the first terminal device 10 by using voice or the like.

Conversely, as shown in FIG. 5, a signal for the service provision start command is transmitted to the server device 300 (26), and then the required information is selected (27). In this case, when an approval request signal is sent to the second terminal device 20, the user of the second terminal device 20 may input a rejection command by means of the input unit 291 or the sound input unit 295 in response to the approval request signal. Then, the second terminal device 20 may transmit a signal corresponding to rejection to the server device 300 according to the input rejection command (29).

In response to reception of the signal corresponding to the rejection, the server device 300 may transmit a guidance message indicating that the user of the second terminal device 20 has rejected the provision of the service (hereinafter referred to as a "rejection guidance message") to the first terminal device 10 (30). In this case, the rejection guidance message may be transmitted to the first terminal device 10 by using, for example, SMS, MMS, email, instant messaging, or other appropriate text or image transmission methods.

In this case, a service performed using contexts of the second terminal device 20 and the user of the second terminal device 20 is not provided to the first terminal device 10, and also a service performed using contexts of the first terminal device 10 and the user of the first terminal device 10 is not provided to the second terminal device 20.

An example in which a call service is provided by a context-based action determination system will be described below with reference to FIGS. 6 and 7.

Figure 6:
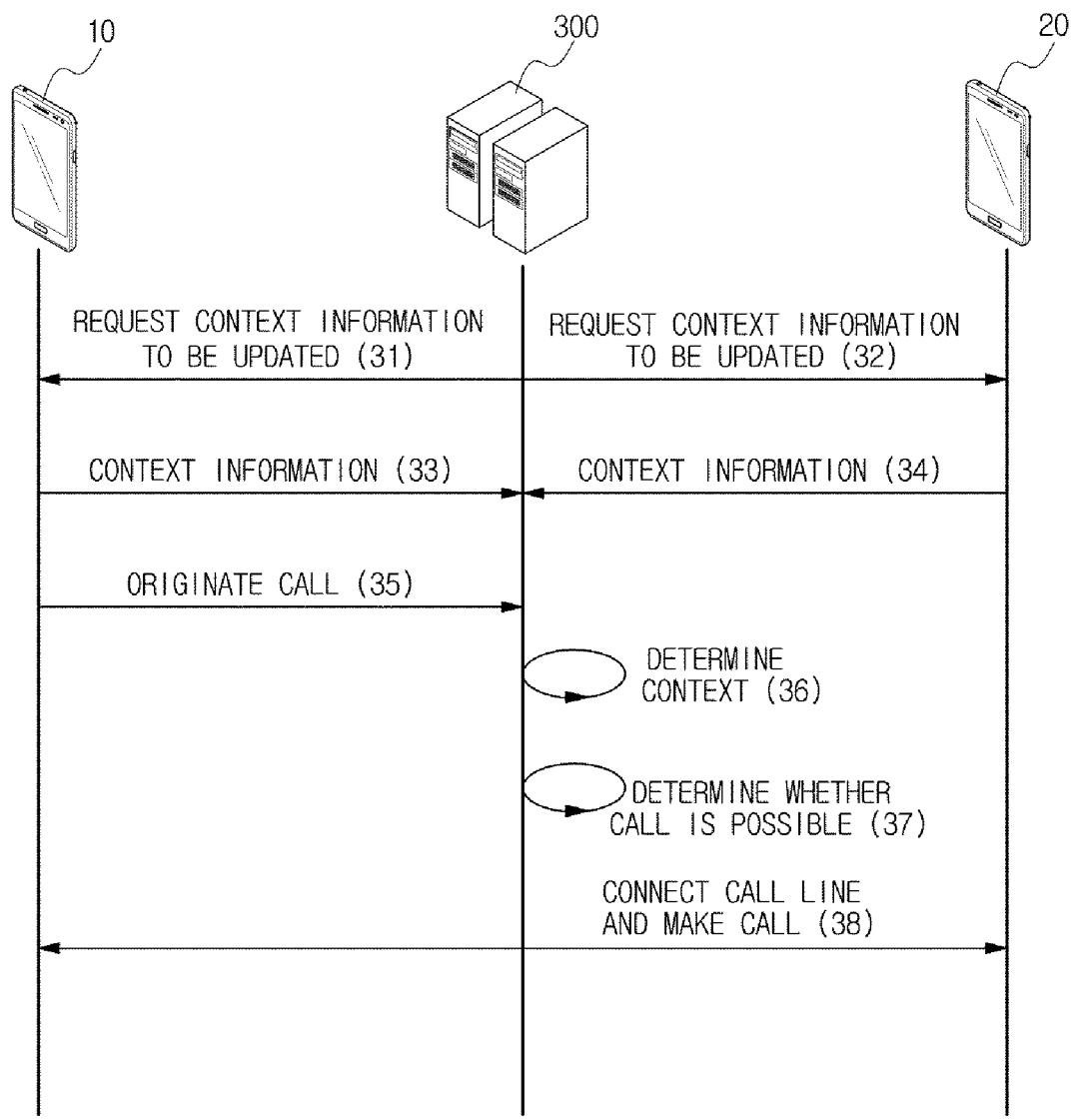
FIG. 6 is a first diagram illustrating an example of a process of originating a call to the second terminal device by using a context-based action determination system.
Figure 7:
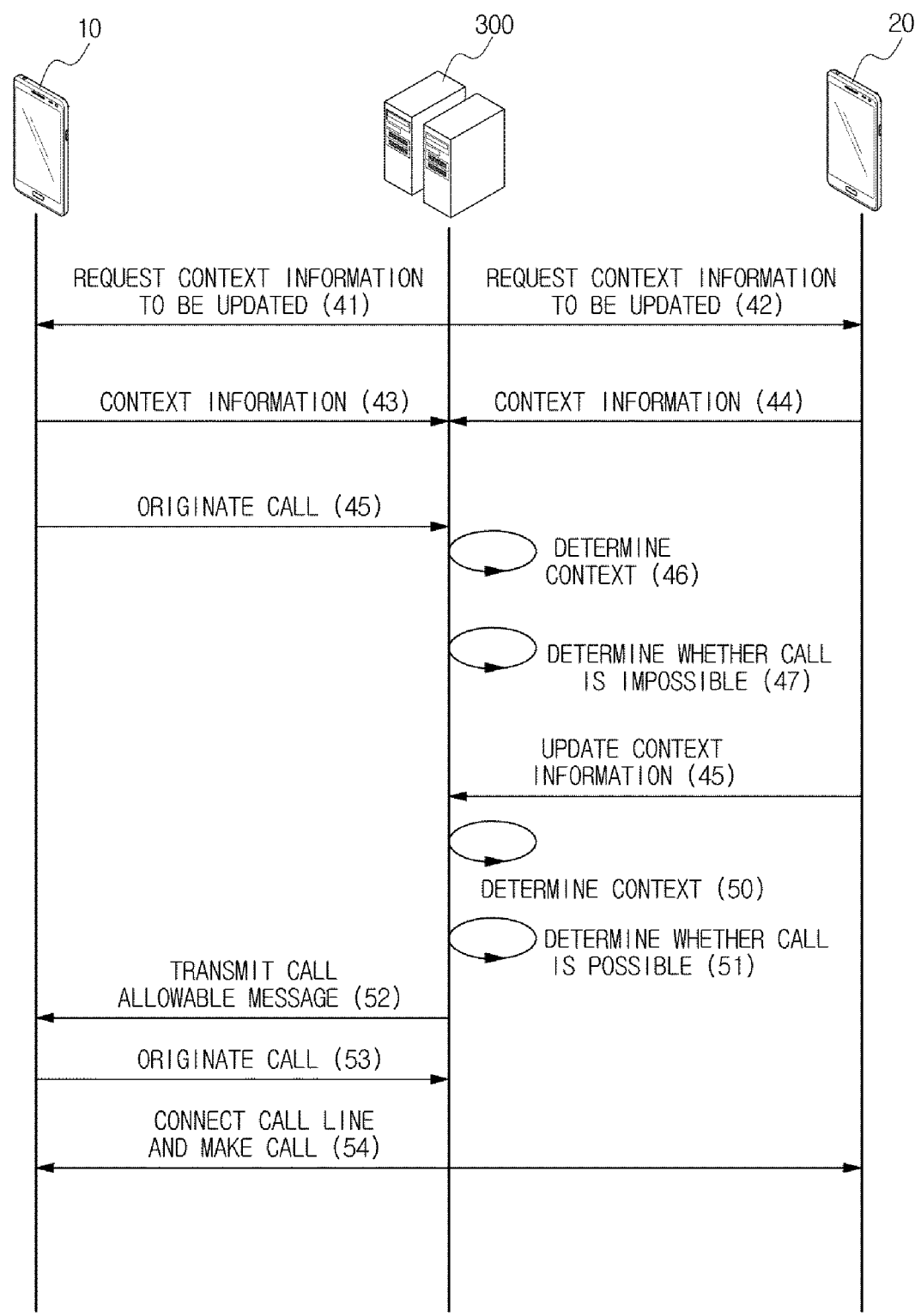
FIG. 7 is a second diagram illustrating an example of a process of originating a call to the second terminal device by using a context-based action determination system.

FIG. 6 is a first diagram illustrating an example of a process of originating a call to the second terminal device by using a context-based action determination system, and FIG. 7 is a second diagram illustrating an example of a process of originating a call to the second terminal device by using a context-based action determination system.

As shown in FIG. 6, after the service starts to be provided, the server device 300 may transmit a context information update request signal to at least one of the first terminal device 10 and the second terminal device 20 periodically, aperiodically, or depending on whether a relevant condition is satisfied (31, 32). In response to reception of the context information update request signal, the at least one of the first terminal device 10 and the second terminal device 20 may transmit context information to the server device 300 according to a previous definition or according to a user's choice (33, 34).

The above-described process of updating context information (31 to 34) may continue to be performed while the following actions 35 to 38 are performed.

The first terminal device 10 originates a call when a predetermined trigger is generated (35). In this case, the trigger may include a user's manipulation of the first terminal device 10 or an action of determining a final action as described below.

The server device 300 may determine one or more contexts of at least one of the second terminal device 20 and the user of the second terminal device 20 in response to the origination of the call (36).

For example, the server device 300 may read a schedule of the user of the second terminal device 20 stored in the auxiliary memory device 330 or the main memory device 249 or the auxiliary memory device 240 of the second terminal device 20 and determine whether the user of the second terminal device 20 cannot receive a call, for example, whether he or she is participating in a meeting or lecture on the basis of the schedule. Also, as another example, the server device 300 may check a setting state of the notification sound output unit 271 of the second terminal device 20 stored in the auxiliary memory device 330 or the like and determine whether the second terminal device 20 is in a predetermined mode, for example, a vibration mode or a silent mode. As still another example, the server device 300 may check location information of the second terminal device 20 stored in the auxiliary memory device 330 or the like and determine whether the second terminal device 20 is located at a disallowed location, for example, inside a theater.

The server device 300 may check one or more contexts and determine whether a call is available on the basis of a result of the check (37). In this case, the server device 300 may read a database or the like that is stored in the auxiliary memory device 330 or the like and associated with determination of whether a call is available, acquire data corresponding to the checked contexts, and determine whether a call is available on the basis of the acquired data.

When it is determined that the call is available, the server device 300 may connect the first terminal device 10 and the second terminal device 20 to enable the first terminal device 10 and the second terminal device 20 to communicate with each other (38). For example, the first terminal device 10 sends a call to the second terminal device 20 according to the origination of the call by the first terminal device 10, and the second terminal device 20 outputs a call reception notification signal to the outside by means of the notification sound output unit 271 or the like in response to reception of the call. When the user of the second terminal device 20 accepts to receive the call, the server device 300 may communicably connect the first terminal device 10 and the second terminal device 20 to enable the call to be made between the first terminal device 10 and the second terminal device 20.

As shown in FIG. 7, the server device 300 may determine that the call is not allowed according to a result of the determination.

In detail, as shown in FIG. 7, as described above, the context information update request may be transmitted periodically, aperiodically, or depending on whether a relevant condition is satisfied, and context information may be transmitted and updated. (41 to 44). According to an embodiment, the update of context information may continue to be performed while the following actions 45 to 54 are performed.

As described above, when the first terminal device 10 originates a call in response to the generation of the predetermined trigger (45), the server device 300 may determine one or more contexts of at least one of the second terminal device 20 and the user of the second terminal device 20 in response to the origination of the call (46).

As described above, the server device 300 may check a schedule of the user of the second terminal device 20, a setting state of the notifier 270 of the second terminal device 20, and/or location information of the second terminal device 20 and determine that the call is not allowed (47).

When it is determined that the call is disallowed, the server device 300 may transmit a call disallowance guidance message to the first terminal device 10 (48). The call disallowance guidance message may include a fact that the call is not allowed and, as necessary, may further include information regarding why the call is disallowed. Also, the call disallowance guidance message may further include information regarding a call available time.

Subsequently, the server device 300 may periodically or aperiodically determine whether the second terminal device 20 or the user of the second terminal device 20 is in a call allowance state (49, 50). In this case, the server device 300 may use the context information updated by the second terminal device 20 (49) or use a separate clock to determine whether the second terminal device 20 or the user of the second terminal device 20 is in the call allowance state.

In this case, the server device 300 may determine that the call is allowed when a predetermined condition is satisfied. For example, when a call disallowance context is not recorded to the schedule of the user of the second terminal device 20 after a certain period of time has elapsed, when the second terminal device 20 moves to a call allowable location according to the updated context information, or when the second terminal device 20 is set to a sound mode, the server device 300 may determine that the call is allowed (51).

When the call is allowed, the server device 300 may transmit a message indicating that the call is allowed (hereinafter referred to as a "call allowance message") to the first terminal device 10 through text, images, or voice (52). The call allowance message may be provided to the user through the display 193 or the sound output unit 197 of the first terminal device 10.

The call allowance message displayed on the first terminal device 10 may include an option for asking whether to make a call, depending on embodiments. The user of the first terminal device 10 may read the call allowance message and determine whether to originate a call. When the user determines to originate a call to the second terminal device 20 and inputs a call origination command by manipulating the input unit 191 of the first terminal device 10 or selects an option for the call origination among the above-described plurality of options, the first terminal device 10 originates a call to the server device 300 (53).

When the user of the second terminal device 20 accepts to receive the call, the server device 300 communicably connects the first terminal device 10 and the second terminal device 20 to enable the call to be made between the first terminal device 10 and the second terminal device 20 (54).

An example in which a schedule setting service is provided by a context-based action determination system will be described below with reference to FIGS. 8 and 10.

Figure 8:
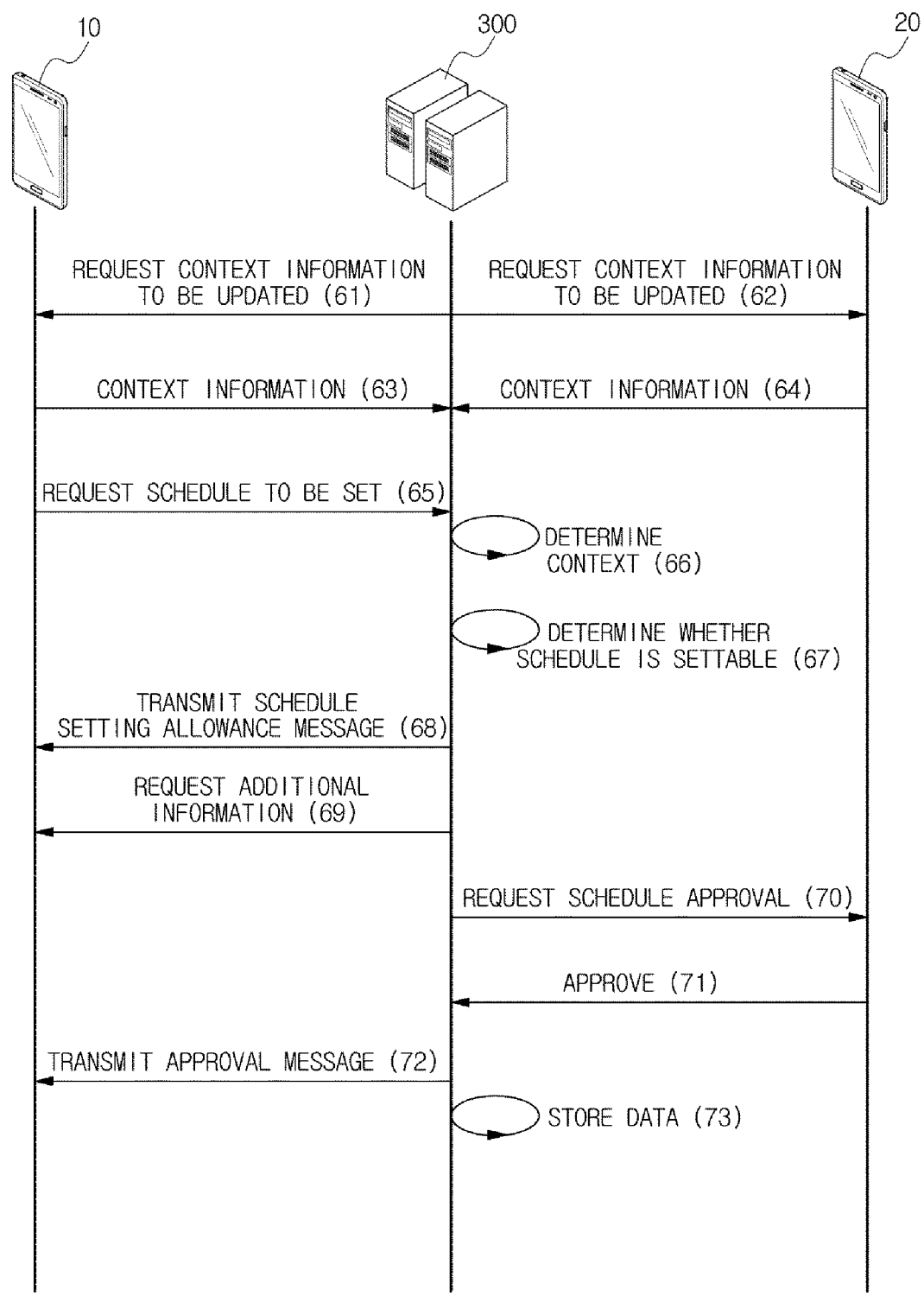
FIG. 8 is a first diagram illustrating an example of a process of setting a schedule between a plurality of users by using a context-based action determination system.
Figure 9:
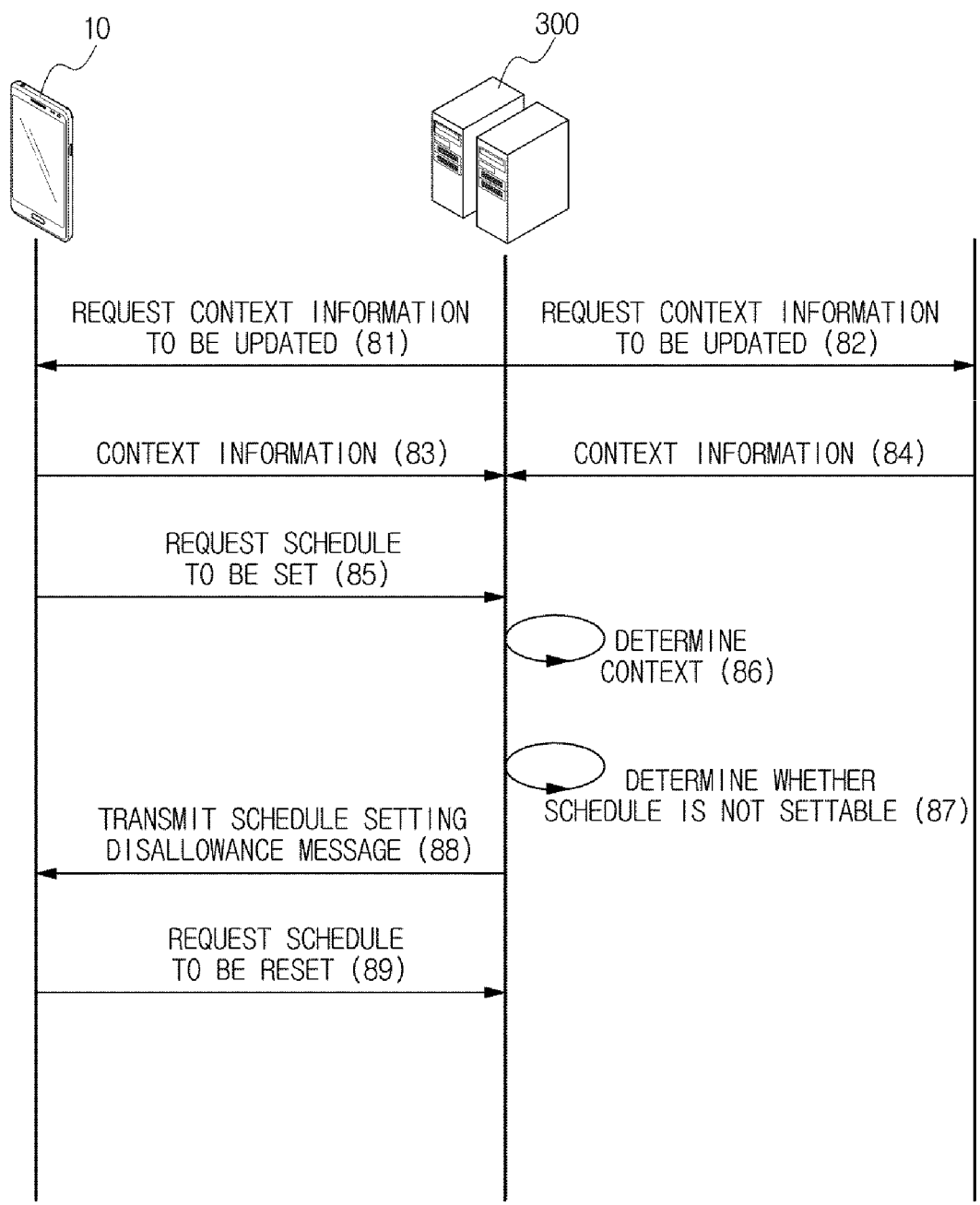
FIG. 9 is a second diagram illustrating an example of a process of setting a schedule between a plurality of users by using a context-based action determination system.
Figure 10:
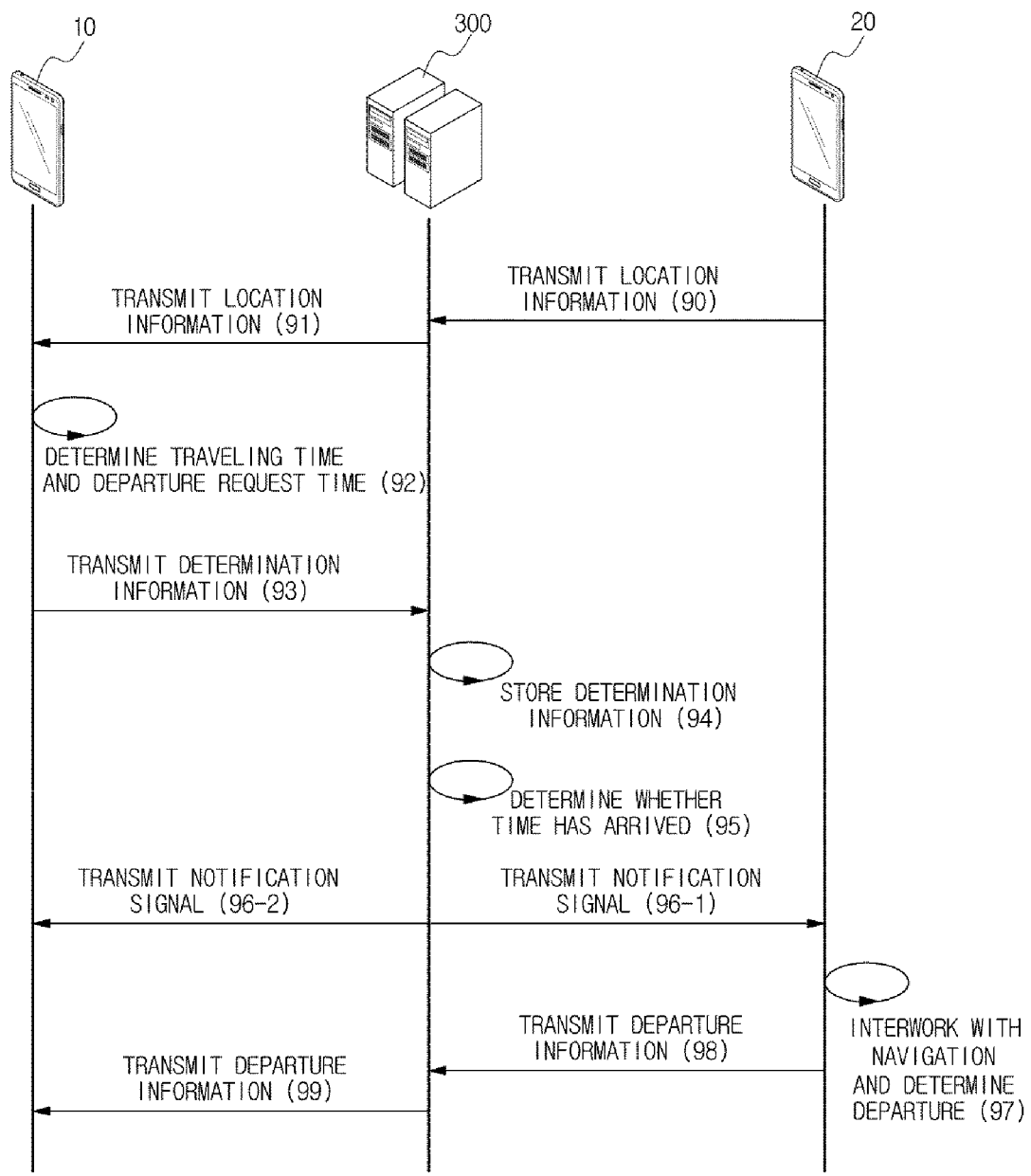
FIG. 10 is a third diagram illustrating an example of a process of setting a schedule between a plurality of users by using a context-based action determination system.

FIG. 8 is a first diagram illustrating an example of a process of setting a schedule between a plurality of users by using a context-based action determination system, FIG. 9 is a second diagram illustrating an example of a process of setting a schedule between a plurality of users by using a context-based action determination system, and FIG. 10 is a third diagram illustrating an example of a process of setting a schedule between a plurality of users by using a context-based action determination system.

Referring first to FIG. 8, as described above, the context information update request may be transmitted periodically, aperiodically, or depending on whether a relevant condition is satisfied, and context information may be transmitted and updated. (61 to 64). The update of the context information may be further performed while the following actions 65 to 73 are performed.

First, the first terminal device 10 transmits a schedule setting request signal to the server device 300 (65). In this case, when the user of the first terminal device 10 manipulates the first terminal device 10 to input a schedule setting request command and information needed for schedule setting, the first terminal device may create a schedule setting request signal using the input command and information and then transmit the created schedule setting request signal to the server device 300.

The information needed for schedule setting may include at least one of, for example, a time, a place, and a selected call partner. The selected call partner may include at least one call partner among a plurality of selectable calling parties, for example, the user of the second terminal device 20 and users of other terminal devices that may participate in the service.

According to embodiments of the present disclosure, when a predetermined trigger is generated, the first terminal device 10 may transmit a schedule request signal to the server device 300 in response to the generation of the predetermined trigger.

In response to the schedule setting request, the server device 300 may determine a selected call partner (e.g., the user of the second terminal device 20) and a context of a terminal device (e.g., the second terminal device 20) of the selected call partner on the basis of the terminal device of the selected partner and a context of the selected call partner (66).

When the server device 300 determines that a schedule is settable with a call partner selected at a given time or place, the server device 300 may transmit a message indicating that the schedule is settable to the first terminal device 10 by using at least one method such as SMS (68).

When it is determined that some of the information needed for schedule setting is omitted, the server device 300 may transmit a request signal for providing additional information to the first terminal device 10 (69). For example, the server device 300 may further transmit a request signal for a place to be set to the first terminal device 10. In this case, the request signal for a place to be set may include information regarding a preset place. For example, when a schedule preset between the user of the first terminal device 10 and a call partner, for example, the user of the second terminal device 20 is found in the auxiliary memory device 330, the server device 300 may acquire information regarding an appointed place from the preset schedule. Subsequently, the server device 300 may create a request signal for the place to be set, which includes the acquired information regarding the appointed place, and transmit the created request signal to the first terminal device 10.

When all of the information needed for schedule setting is provided from the first terminal device 10, the additional information request process (69) can be omitted.

When it is determined that the schedule is settable (67), the server device 300 may set a schedule and request a schedule approval request to the terminal device of the selected call partner, that is, the second terminal device 20 (70).

When the selected call partner, for example, the user of the second terminal device 20 manipulates the terminal device of the selected call partner, for example, the input unit 291 of the second terminal device 20 to input an schedule approval command, the terminal device 20 of the selected call partner transmits a signal corresponding to approval to the server device 300 (71).

In response to reception of the signal corresponding to the approval, the server device 300 may confirm the preset schedule and, as necessary, may transmit a message regarding approval of the schedule to the first terminal device 10 (72) and/or store the schedule in the auxiliary memory device 330 (73). By storing the schedule in the auxiliary memory device 330, information regarding a schedule of at least one of the user of the first terminal device 10 and the user of the second terminal device 20 may be updated.

When the selected call partner manipulates the terminal device of the selected call partner to input a schedule rejection command, the terminal device of the selected call partner may transmit a signal corresponding to rejection to the server device 300. In response to the signal, the server device 300 may stop the schedule setting and transmit a message regarding the stop of the schedule setting to the first terminal device 10.

Referring next to FIG. 9, as described above, the context information update request may be transmitted periodically, aperiodically, or depending on whether a relevant condition is satisfied, and context information may be transmitted and updated (81 to 84). The update of context information may be additionally performed while the following actions 85 to 89 are performed.

The user of the first terminal device 10 may input a schedule setting request command and information needed for schedule setting to the first terminal device 10, and the first terminal device 10 may transmit a schedule setting request signal created using the input command and information to the server device 300 (85). As described above, the information needed for schedule setting may include at least one of, for example, a time, a place, and a selected call partner.

The server device 300 may receive a schedule setting request and may determine a selected call partner (e.g., the user of the second terminal device 20) and a context of a terminal device (e.g., the second terminal device 20) of the selected call partner on the basis of the terminal device of the selected partner and a context of the selected call partner in response to the schedule setting request (86).

As a result of the context determination, the server device 300 may determine that the schedule is not settable (87). For example, when a time set to be scheduled overlaps a predetermined schedule, for example, a lecture, a business meeting, or an appointment as a result of reading information regarding a schedule of the selected call partner, the server device 300 may determine that the schedule is not settable.

When it is determined that the schedule is not settable, the server device 300 may transmit a message indicating that the schedule is not settable (hereinafter referred to as a schedule setting disallowance guidance message) to the first terminal device 10 (88). For example, the schedule setting disallowance guidance message may include a fact that the schedule is not settable. As necessary, the schedule setting disallowance guidance message may include information regarding at least one of a time, a place, and a call partner that may be set to be scheduled and/or may further include information regarding why the schedule is not settable.

The first terminal device 10 may provide the schedule setting disallowance guidance message by means of at least one of the display 193 and the sound output unit 197 to the user of the first terminal device 10. The user may receive the schedule setting disallowance guidance message and reset a schedule according to the users intention.

When a command or data is input to reset the schedule, the first terminal device 10 may transmit a schedule reset request to the server device 300 (89). In this case, the server device 300 may further perform the above-described actions associated with the schedule setting (65 to 73 in FIG. 8 or 85 to 88 in FIG. 9).

When a schedule is set between the user of the first terminal device 10 and a desired call partner, for example, the user of the second terminal device 20, as shown in FIG.

10, a service corresponding to the schedule setting may be additionally provided to at least one of the user of the first terminal device 10 and the user of the second terminal device 20.

For example, as shown in FIG. 10, the server device 300 may additionally perform a schedule notification service or an information provision service regarding whether a call partner, for example, the user of the second terminal device 20 departs or not.

As shown in FIGS. 8 and 10, the second terminal device 20 may transmit the signal corresponding to the approval to the server device 300 (71), and the server device 300 may set and store the schedule (73). Subsequently, the server device 300 may receive location information of the second terminal device 20 from the second terminal device 20 as necessary (90). The reception of the location information of the second terminal device 20 may be performed periodically, aperiodically, or a certain time before a time set according to the schedule (e.g., an appointed time) has arrived.

The server device 300 may transmit the received location information to the first terminal device 10, if desired (91).

The first terminal device 10 may receive the location information of the second terminal device 20 and may calculate and determine at least one of a required travel time, a route, and a distance from a current location of the second terminal device 20 to a place set during the schedule setting process on the basis of the received location information of the second terminal device 20 (92).

When a required travel time is calculated, the first terminal device 10 may compare the required travel time with a time set during the schedule setting process and may additionally determine a time at which the user of the second terminal device 20 should depart (hereinafter referred to as a departure request time).

At least one of the determined distance, route, required travel time, and departure request time may be transmitted to the server device 300 (93).

According to embodiments of the present disclosure, the process of determining at least one of the distance, route, required travel time, and departure request time (92 and 93) may be performed by the server device 300. In this case, the process of transmitting the location information to the first terminal device 10 (91) may be omitted.

The server device 300 stores the determined information, that is, at least one of the determined distance, route, required traveling time, and departure request time in the auxiliary memory device 330 (94).

The server device 300 may determine whether the time set according to the schedule has arrived, independently or dependently of the process of determining and storing at least one of the distance, route, required travel time, and departure request time (90 to 94).

When a predefined time has arrived according to the schedule, the server device 300 may transmit a notification signal for the time arrival to at least one of the first terminal device 10 and the second terminal device 20 by means of a clock (96-1, 96-2). Here, the predefined time may include the time set during the schedule setting process, a predetermined time before the set time, and/or the departure request time. Also, the notification signal may include a message regarding a fact that the time set according to the schedule or the departure request time has arrived.

According to embodiments of the present disclosure, the notification signal may further include information for the users convenience. For example, the notification signal may include details of the schedule, the departure request time, and/or the required travel time, and the details of the schedule may include at least one of a call partner corresponding to the schedule, the time set according to the schedule, and the place set according to the schedule.

When the first terminal device 10 interoperates with a vehicle 10-1 or a navigation device installed in the vehicle 10-1 and/or when the second terminal device 20 interoperates with a vehicle 20-1 or a navigation device installed in the vehicle 20-1, place information included in at least one of the schedule approval request and the notification signal may be transmitted to the vehicle 10-1 or 20-1 or the navigation device installed in the vehicle 10-1 or 20-1. In this case, the vehicle 10-1 or 20-1 or the navigation device installed in the vehicle 10-1 or 20-1 may receive the place information and set a place corresponding to the received place information as a destination (97).

Also, at least one of the first terminal device 10 and the second terminal device 20 may transmit information regarding whether he or she departs (hereinafter referred to as "departure information") to the server device 300. The departure information may include information indicating that at least one of the user of the first terminal device 10 and the user of the second terminal device 20 has departed to the destination. Also, the departure information may further include information regarding a departure time or a departure location.

At least one of the first terminal device 10 and the second terminal device 20 may acquire the departure information according to a manual input of at least one of the user of the first terminal device 10 and the user of the second terminal device 20 or may acquire the departure information on the basis of a change in location acquired through the location information collectors 153 and 253.

The server device 300 may receive the departure information and transmit the received departure information to at least one of the first terminal device 10 and the second terminal device 20 (99). Thus, the user of the first terminal device 10 may check whether the call partner has departed to an appointed place. In this case, at least one of the first terminal device 10, the second terminal device 20, and the server device 300 may determine an estimated arrival time for the set place by using the departure time and the required travel time. The determined estimated arrival time may be visually or audibly provided to at least one of the user of the first terminal device 10 and the user of the second terminal device 20 by at least one of the first terminal device 10 and the second terminal device 20.

Among several services providable by the context-based action determination system, the call service and the schedule setting service have been described above as an example. The service that may be performed by the context-based action determination system is not limited thereto. According to embodiments of the present disclosure, various services considerable by a designer may be performed and provided using the above-described context-based action determination system.

An example of a process of determining a final action used as a trigger of the above-described service provision or service provision start will be described with reference to FIGS. 11 to 19.

According to embodiments of the present disclosure, at least one of the processor 100 of the first terminal device 10 and the processor 200 of the second terminal device 20 may perform a voice recognition action, a recommended action determination action, and/or a final action determination action.

In order to avoid repetition of description, operation of the processor 100 of the first terminal device 10 will be described, but the following description may be applied to the processor 200 of the second terminal device 20 without change or with partial modification.

According to embodiments of the present disclosure, the processor 100 of the first terminal device 10 may extract a voice part from sound input through the sound input unit 195 and perform voice recognition using the voice part. Thus, the user may input a voice command to the first terminal device 10.

Also, the processor 100 may predict and determine a predetermined action according to the user's command and operate the first terminal device 10 according to the predicted and determined action. For example, the processor 100 may determine a recommended action on the basis of context information collected by a context recognition database 141 and various devices capable of collecting the context information, for example, the clock 151, the location information collector 153, and/or various other data collection devices, verify the determined recommended action by means of a selection history database 143, and then determine a final action for the first terminal device 10 on the basis of a result of the verification.

In another example, the processor 100 may propose the determined final action to the user as the recommended action, perform calculation and processing such that the first terminal device 10 operates according to the final action without the proposal of the recommended action, or control each component.

The operation and function of the processor 100 will be described in detail below.

Figure 11:
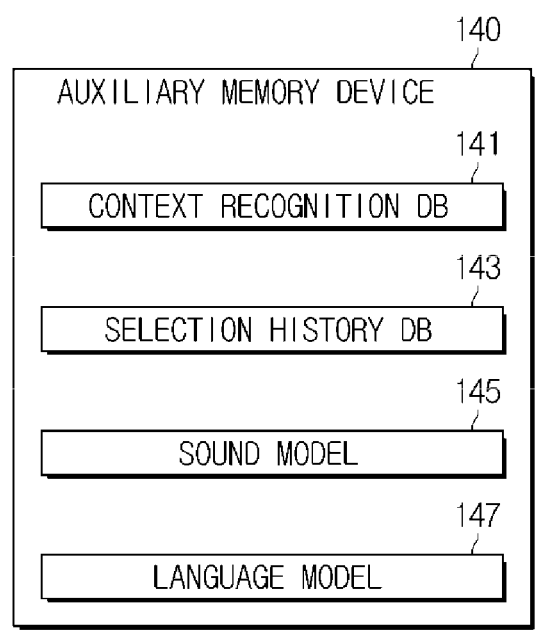
FIG. 11 is a diagram showing an example of a database stored in an auxiliary memory device.

FIG. 11 is a diagram showing an example of a database stored in an auxiliary memory device, and FIG. 12 is a diagram showing an example of a context recognition database corresponding to a phone call originating action.

Referring first to FIG. 11, the auxiliary memory device 140 may store the context recognition database 141 and the selection history database 143 and may further store a sound model 145 and a language model 147 as necessary.

Referring next to FIG. 12, the context recognition database 141, which is a database used to create the recommended action, may include a plurality of records R11 to R13. Each of the records R11 to R13 may include an identifier f0 for recognizing each of the records R11 to R13 and field data corresponding to each of a plurality of fields f11 to f15.

The context recognition database 141 may include at least one different field and field data according to properties of each reference action.

For example, as shown in FIG. 11, when the context recognition database 141 is a database DB1 regarding a call originating action, each of the records R11 to R13 may include field data corresponding to a call target field f11 for a recipient, a call means field f12 for a terminal device of a recipient, a call date field f13, a call time field f14, and/or a field f15 for a place where a user originates a call.

Also, as another example, the context recognition database 141 may be a database for a destination searching and setting action. In this case, each of the records may include field data corresponding to a field for a point of interest, a field for a location corresponding to a point of interest on a map, a field for a device used for search, a field for a day of week for search, a field for a time for search, a field for a place for search, and/or a field for other information.

According to embodiments of the present disclosure, the context recognition database 141 used to determine the recommended action may be composed of the same fields with respect to different reference actions.

The field data stored in the fields f11 to f14 of the context recognition database 141 may be acquired on the basis of actual operation of the first terminal device 10 according to the user's selection.

FIG. 13 is a diagram showing an example of a selection history database and a use history database associated with a phone call originating action.

The selection history database 143 may include a plurality of records r21 and r22, and each of the records r21 and r22 may include at least one piece of field data corresponding to each of at least one or more fields f31 to f33. In this case, each of the fields f31 to f33 may include a field f31 for a predetermined recommended action or final action, a field f32 for a recommendation index corresponding to a predetermined recommended action or final action, and a field f33 for an action that is actually performed while a predetermined recommended action or final action is proposed to a user.

For example, as shown in FIG. 13, for a selection history database DB3 for call origination, any one record, for example, each of the fields f31 to f33 of the first record r21 may include field data regarding information indicating that call origination sequentially using cellphone numbers has been determined as the recommended action, field data regarding information indicating that a recommendation index for the determined recommended action has been determined to be any value, for example, 89, and field data indicating call origination has been performed using cellphone numbers.

The operation and function of the processor 100 will be described in detail below.

Figure 14:
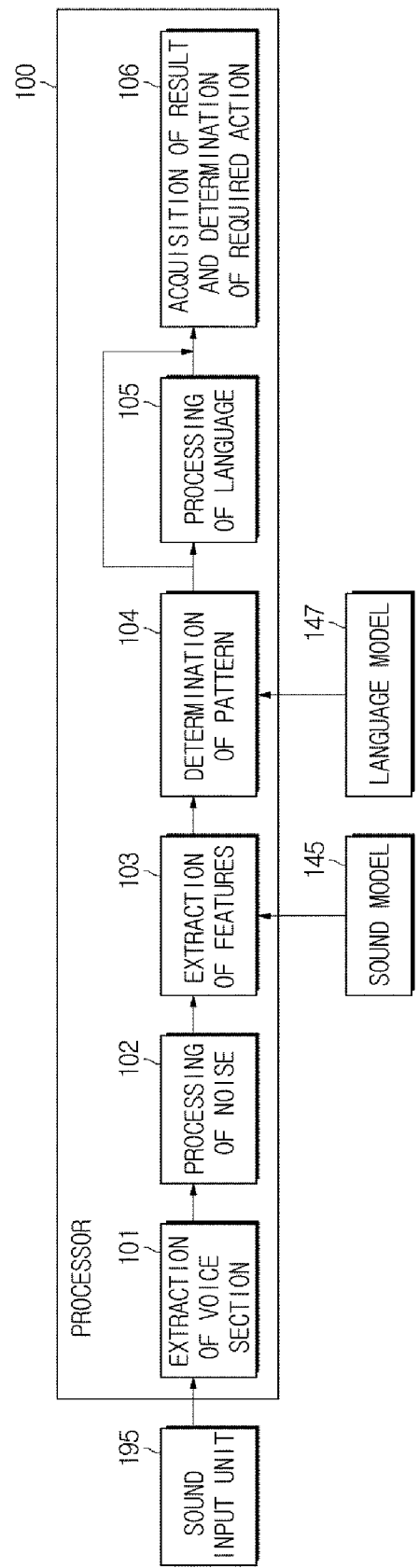
FIG. 14 is a diagram schematically showing an example of a voice recognition process performed by a processor.

FIG. 14 is a diagram schematically showing an example of a voice recognition process performed by a processor.

When a user utters a command, the uttered voice is input through the sound input unit 195. As shown in FIG. 14, the sound input unit 195 may output an electric signal corresponding to the uttered voice. The output electric signal may be transferred to the processor 100.

The processor 100 performs voice recognition on the basis of the received electric signal.

In detail, referring to FIG. 14, the processor 100 may detect a voice section from the received electric signal first (101). Here, the voice section denotes a section in which the voice uttered by the user is, or is likely to be, present.

When the voice section is detected, the processor 100 may remove and/or reduce noise present in the voice section (102). The processor 100 may use at least one filter to remove the noise present in the voice section. The noise removal process 102 may be omitted depending on embodiments.

Subsequently, the processor 100 may extract a voice feature from the voice section. In this case, the processor 100 may extract the voice feature from the voice section in the form of a feature vector by using at least one of a linear prediction coefficient (LPC), a cepstrum, a Mel-frequency cepstral coefficient (MFCC), and filter bank energy.

In response to the extraction of the voice feature, the processor 100 may determine a pattern corresponding to the extracted voice feature (104). For example, the processor 100 may determine the pattern corresponding to the voice feature by using a predefined predetermined sound model 145. The sound model 145 may be acquired by modeling signal characteristics of the voice. The processor 100 may determine the pattern corresponding to the voice feature by using the sound model 145 to acquire a frequency pattern identical or similar to that of a human voice. Accordingly, a predetermined vocabulary such as a word, syllable, or short phrase may be recognized from the voice input through the sound input unit 195.

As necessary, the processor 100 may recognize a sentence or the like by additionally using a predetermined language model 147 to perform language processing (105). The language model 147 may be created on the basis of a human language, grammar, and so on in order to determine a linguistic order relation of the recognized word, syllable, phrase, or the like. Thus, the processor 100 may recognize a sentence corresponding to the voice.

The processor 100 may acquire a voice recognition result through at least one of the pattern determination process 104 and the language processing process 105 and may determine an action required or commanded by the user through the utterance according to the voice recognition result. In detail, the processor 100 may determine a reference action corresponding to the voice recognition result by, or without, using a predetermined database or the like and may determine the determined reference action as the action required by the user. Here, the predetermined database may be established on the basis of data regarding the voice recognition result and the reference action corresponding to the voice recognition result. When the voice recognition is appropriately performed, the action required or commanded by the user through the utterance may be the same as the reference action determined by the processor 100.

When it is impossible to determine the reference action corresponding to the voice recognition, the processor 100 determine that an error is generated in the voice recognition or the action determination, and the processor 100 may perform the voice recognition action again or control each component of the first terminal device 10 to request that the user utter a voice again or to request that the user input a command by means of another input means, for example, the above-described input unit 191, according to a previous definition made by the user or designer. The request for the utterance or the command input may be performed by at least one of the display 193 and the sound output unit 197.

The reference action determined by the processor 100 may include at least one of various actions capable of being performed by the first terminal device 10. For example, the reference action may include at least one of various actions considerable by a designer, such as a call origination action or call acceptance or rejection action for a specific person, an action of setting a specific place as a destination, an action of guiding a route to a predetermined destination, a temperature adjustment action, a message transmission action, an action of converting text included in an email or message into voice, an action of outputting voice corresponding to text, an action of playing music or video, a predetermined screen display action, or an action of changing a channel or volume of a radio or a television.

Figure 15:
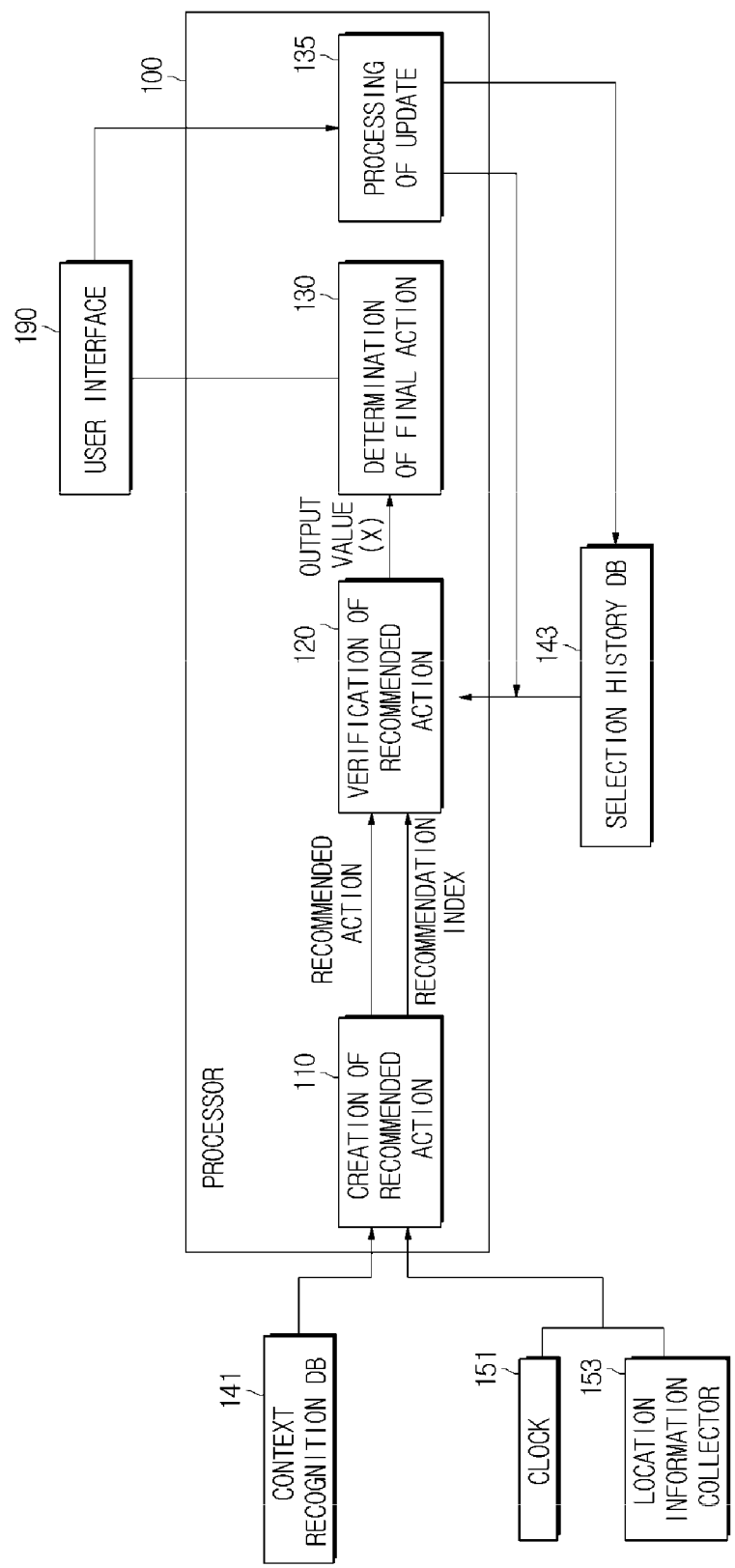
FIG. 15 is a first diagram illustrating an exemplary process performed by a processor.
Figure 16:
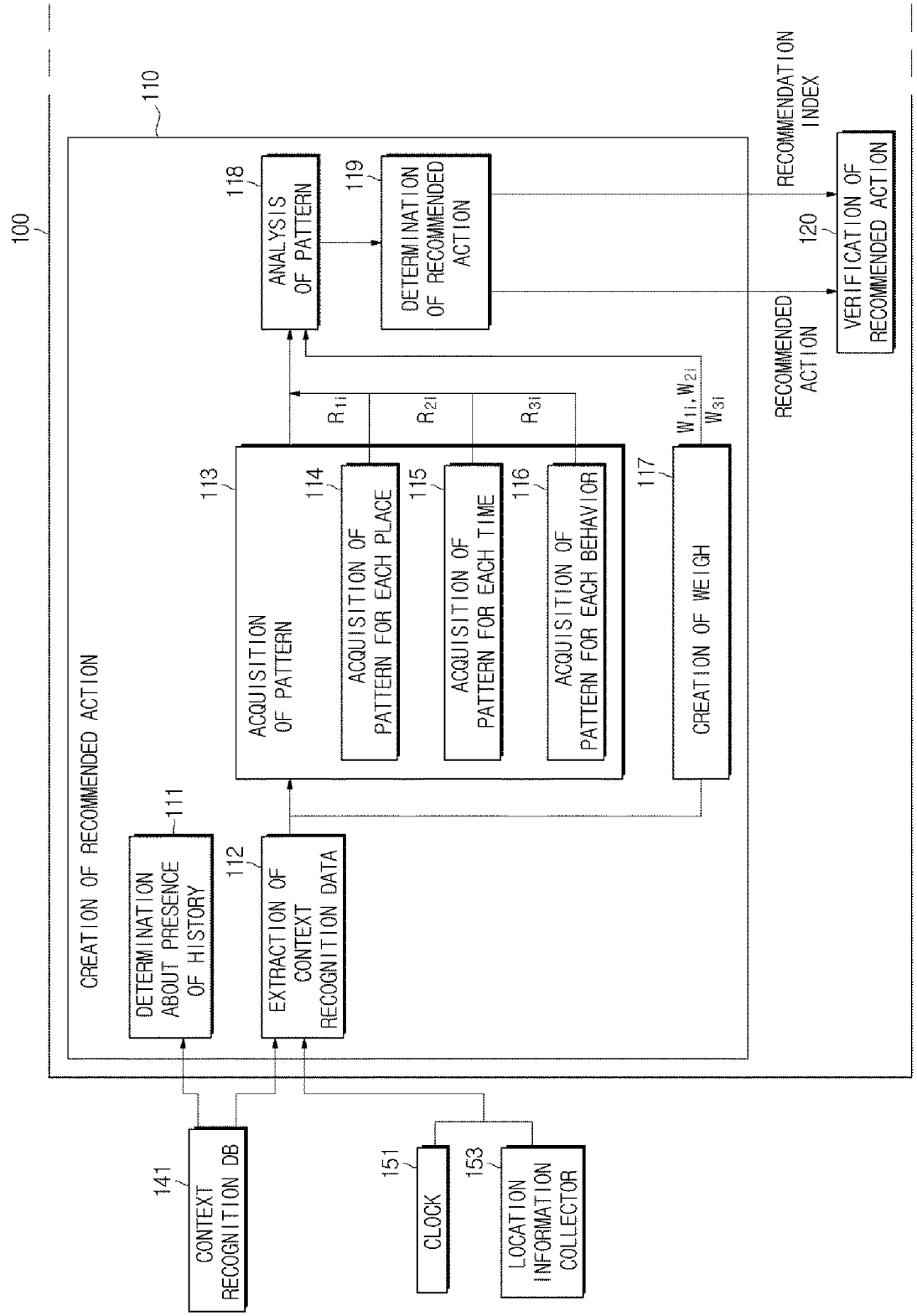
FIG. 16 is a second diagram illustrating an exemplary process performed by a processor.

FIG. 15 is a first diagram illustrating an exemplary process performed by a processor, and FIG. 16 is a second diagram illustrating an exemplary process performed by a processor.

When the reference action is determined according to a user command input through the input unit 191 or when the reference action is determined corresponding to a user command according to voice recognition as described above, the processor 100 may determine a final action using a current state or a predetermined users behaviors. The final action refers to a detailed action for the reference action. For example, when the determined reference action is an action of calling a specific person, the final action is a detailed action for a calling means in the reference action. In more detail, for example, the final action is an action of calling a cellphone of the specific person.

Specifically, as shown in FIG. 15, the processor 100 may receive information for determining a current state from the location information collector 153, acquire information regarding an action selected by a user in a specific context, that is, an action having been performed by the first terminal device 10 from the context recognition database 141, and then create a recommended action using the acquired or received information.

Also, the processor 100 may determine a recommendation index corresponding to the recommended action. The recommendation index, which is an index indicating how appropriate the recommended action is for the current context, may be embodied as numerical values.

According to embodiments of the present disclosure, as shown in FIG. 16, the processor 100 may determine whether there is a history first (111).

In detail, the processor 100 may attempt to call a context recognition database 141 corresponding to a reference action that is input through the input unit 191 or determined through the voice recognition process and may determine whether the context recognition database 141 is called.

In this case, the processor 100 may call different context recognition databases 141 depending on actions required or commanded by a user. For example, a context recognition database 141 associated with a phone call may be called when a user inputs a phone call command, and a context recognition database 141 associated with temperature adjustment may be called when a user inputs a temperature adjustment command. Also, a context recognition database 141 associated with a destination search or setting may be called when a user inputs a destination search or setting command. In addition, the processor 100 may call an appropriate context recognition database 141 according to a user command.

Also, when the context recognition database 141 is called, the processor 100 may determine whether there is a prestored history associated with the reference action on the basis of the called context recognition database 141 (111). In other words, the processor 100 may determine whether data needed to create a recommended action is present in the context recognition database 141.

When the context recognition database 141 corresponding to the reference action is not called or when a prestored history, that is, a record is not present in the called context recognition database 141, the processor 100 may perform an action according to predefined settings without performing a recommended action creation process (110), a recommended action verification process (120), and a final action determination process (130).

For example, when the context recognition database 141 corresponding to the reference action is not called or when a prestored history is not detected in the called context recognition database 141, the processor 100 may control the display 193 of the user interface 190 to display a list including at least one piece of data corresponding to a result of the voice recognition. For example, when the reference action is a phone call, the list may include at least one recipient and one or more phone numbers corresponding to the recipient, which are determined as corresponding to the voice recognition result. The user may check data of the displayed list, manipulate the input unit 191, and select at least one piece of the data of the displayed list. The processor 100 may control the first terminal device 10 to operate according to the data selected by the user.

Also, according to embodiments of the present disclosure, when the context recognition database 141 corresponding to the reference action is not called or when a prestored history is not detected in the called context recognition database 141, the processor 100 may update the context recognition database 141 using a result of the selection performed by the user. For example, the processor 100 may update the context recognition database 141 by adding a record including various types of data corresponding to the selection result, for example, recipients and their phone numbers to the context recognition database 141.

When the context recognition database 141 corresponding to the determined action is called or when a record is prestored in the called context recognition database 141, the processor 100 may receive various types of information needed for context recognition from the clock 151, the location information collector 153, and/or various other data collection devices.

The process 111 of determining whether the above-described context recognition database 141 is called or whether a history is present in the context recognition database 141 will be omitted according to an embodiment.

Also, the processor 100 may acquire context information needed for context recognition from the clock 151, the location information collector 153, and/or various other data collection devices. For example, the processor 100 may acquire a current time from the clock 151 and/or acquire location information of a user from the location information collector 153.

The processor 100 may extract at least one piece of data (e.g., at least one record or field data of the recode) from the called context recognition database 141. In this case, according to an embodiment, the processor 100 may further perform a process of calling the context recognition database 141 before extracting data. As described above, a context recognition database 141 called from the auxiliary memory device 140 may be a database corresponding to a reference action that is input through the input unit 191 or determined on the basis of the voice recognition process.

When a call originating action for a specific person is determined as the reference action corresponding to the user's command, the processor 100 may detect records corresponding to the specific person in the called context recognition database 141.

Subsequently, the processor 100 may determine a selection pattern for a recommended action by using the context information and the detected records (113). In detail, for example, when a user inputs a call origination command for a specific person, the processor 100 may determine a selection pattern regarding by which method or means the user calls the specific person on the basis of a predefined analysis criterion (e.g., a place, a time, or an entire behavior or action). In more detail, for example, when a user calls a specific person, the processor 100 may determine a selection pattern regarding whether the user makes a call by using a cellphone number of the specific person, by using a phone number set as an office number of the specific person, and/or by using a phone number set as a home number of the specific person on the basis of a place, a time, or an entire action.

As shown in FIG. 16, according to embodiments of the present disclosure, the processor 100 may determine according to which selection pattern an action performed at a specific place is determined (114), determine according to which selection pattern an action performed at a specific time is determined (115), and/or determine according to which selection pattern an action entirely performed is determined (116).

According to embodiments of the present disclosure, the processor 100 may create and use a predetermined frequency model in order to determine a selection pattern based on each analysis criterion.

The processor 100 may acquire result values $p1i$, $p2i$, and $p3i$ (here, i=1, 2, 3, . . . ) for the selection patterns based on the analysis criteria, depending on a result of the selection pattern determination process. For example, the processor 100 may acquire a result value $p1i$ for the place-based selection pattern (114), acquire a result value $p2i$ of time-based selection pattern (115), and/or acquire a result value $p3i$ of an entire-action-based selection pattern (116).

In more detail, for example, when a current location acquired by the location information collector 153 is a first region (e.g., an office, a school, or the like) and the reference action is a call origination for a specific person, the processor 100 may detect data regarding the users selection around the first region. In this case, when the data regarding the user's selection is detected around the first region, the processor 100 may assign a predetermined value to each element of the detected selection pattern, that is, each selected action and may acquire a result value $p1i$ (here, i=1, 2, 3, . . . ) for each action on the basis of a place.

The processor 100 may acquire result values $p1i$ corresponding to actions in the first region by using importance levels of the actions relative to all the actions performed in the first region. Thus, the processor 100 may acquire the result values $p1i$ for the selection pattern based on the first region (114).

According to embodiments of the present disclosure, the result values $p1i$ may be defined by using a selection probability or frequency of each of the actions. For example, the result value $p1i$ may be defined as a ratio in frequency of a specific action to all the actions in the first region (i.e., (the number of times the specific action is performed)/(the number of time all the actions are performed). In more detail, for example, the number of times calls are made to a specific recipient in a first region is 100, the number of times a cell phone of the specific recipient is called in the first region is 80, and the number of times a home phone of the specific recipient is called in the first region is 20. In this case, a result value $p11$ corresponding to an action of calling the cell phone of the specific recipient in the first region may be determined to be 0.8, and a result value $p12$ corresponding to an action of calling the home phone of the specific recipient in the first region may be determined to be 0.2

The result values $p11$ and $p12$ may be determined to be various values according to user convenience. For example, instead of 0.8 and 0.2, 80 and 20, which are obtained by multiplying 100 to 0.8 and 0.2, may be determined as the result value $p11$ corresponding to an action of calling the cell phone of the specific recipient in the first region and the result value $p12$ corresponding to an action of calling the home phone of the specific recipient in the first region, respectively.

When there is no selection pattern for a user in the first time period, 0 may be given to the result value $p1i$ based on the place.

Similarly, when a current time acquired by the clock 151 corresponds to a first time period (e.g., afternoon hours), the processor 100 may acquire a result value $p2i$ of each action selected during the first time period. For example, as described above, the processor 100 may acquire the result values $p2i$ for the actions selected during the first time period by using the selection probabilities of the selected actions according to importance levels of the actions relative to all the actions in the first time period. When there is no selection pattern for a user in the first time period, the processor 100 may determine the time-based result values P2i to be 0.

Also, the processor 100 may acquire result values p3i corresponding to actions selected without consideration of a place or time. For example, the processor 100 may acquire the result values p3i corresponding to the actions by the same method described above on the basis of importance levels of the actions with respect to all the actions (116).

According to embodiments of the present disclosure, the processor 100 may analyze the selection pattern by summing or weighted-summing the acquired result values phi, p2i, and p3i by using different analysis criteria for a specific action (118).

In this case, as shown in FIG. 4, the processor 100 may additionally determine weights w11, w12, and w13 to be applied to the result values p1i, p2i, and p3i for the selection patterns based on the analysis criteria, for example, a place, a time, and an entire action.

According to embodiments of the present disclosure, the weights w11, w12, and w13 may be predefined for the analysis criteria, respectively. For example, the processor 100 may determine the weights w11, w12, and w13, which is to be applied to the result values p1i, p2i, p3i corresponding to the analysis criteria, to be the same value.

For example, when the result values p1i, p2i, and p3i corresponding to the selection patterns for a place, a time, and an entire action are all acquired, the processor 100 may determine the weights w11, w12, and w13 to be applied to the result values for the selection patterns based on a place, a time, and an entire action to be the same value, 0.33.

Alternatively, the weights w11, w12, and w13 may be determined depending on the result values p1i, p2i, and p3i corresponding to the analysis criteria. That is, the processor 100 may determine the weights w11, w12, and w13 to be applied to the result values p1i, p2i, and p3i corresponding to the analysis criteria to be the same or different values, depending on the result values p1i, p2i, and p3i.

For example, when the result values p1i, p2i, and p3i are 0, the processor 100 may determine the weights w11, w12, and w13 corresponding to the result values to be 0. When the result values p1i, p2i, and p3i are not 0, the processor may determine the weights w11, w12, and w13 corresponding to the result values p1i, p2i, and p3i to be the same value. In more detail, for example, when the result value p1i of the place-based selection pattern is 0 (i.e., there is no place-based selection pattern) and the result values p2i and p3i of the time-based selection pattern and the entire-action-based selection pattern are not 0 (i.e., there are a time-based selection pattern and an entire-action-based selection pattern), the weight w11 applied to the result value p1i of the place-based selection pattern p1i is determined to be 0, and the weights w12 and w13 applied to the time-based selection pattern and the entire-action-based selection pattern may be determined to be the same value, for example, 0.5.

Unlike that described above, the processor 100 may determine the weights w11, w12, and w13 to be applied to the result values p1i, p2i, and p3i by using at least one method considerable by a designer.

When the result values p1i, p2i, and p3i for each action are acquired, and the analysis-criterion-based weights w11, w12, and w13 are further acquired as necessary, the processor 100 may analyze a pattern thereof and acquire a result of the analysis (118).

According to an embodiment, the pattern analysis may be performed by using composition of the result values p1i, p2i, and p3i for the analysis-criterion-based selection patterns or composition of the result values p1i, p2i, and p3i for the analysis-criterion-based selection patterns and the analysis-criterion-based weights w11, w12, and w13.

In this case, the pattern analysis may be performed using Equation 1 below:

$$Zi = \sum_j w_{1j} \cdot p_{ji} \qquad \text{[Equation 1]}$$

In Equation 1, Zi is an analysis result for a specific action, w1j is an analysis-criterion-based weight, pji is a result value of an action included in a selection pattern based on each analysis criterion, i is a value for identifying each action, and j is a value for identifying each analysis criterion.

The analysis result Zi for the specific action may be individually calculated fro each action. Accordingly, the number of analysis results Zi for specific actions may be given equal to the number of actions included in the selection pattern.

For example, when a user gives a call command to a specific person, there may be no selection pattern for a current place of the user, a ratio of calls using home phone numbers to the total calls in a current time period may be 0.2, a ratio of calls using cell phone numbers to the total calls may be 0.8, a ratio of calls using the home phone numbers to the total actions may be 0.3, and a ratio of calls using the cell phone numbers to the total actions may be 0.7. In this case, weights w11, w12, and w13 for context according to the above example may be determined to be 0, 0.5, and 0.5, respectively. An analysis result Z1 for a pattern of using home phone numbers is 0.25 (=0+0.2/2+0.3/2), and an analysis result Z2 for a pattern of using cell phone numbers is 0.5 (=0+0.3/2+0.7/2).

The processor may determine a recommended action on the basis of the analysis results for the patterns and also may determine a recommendation index corresponding to the recommended action (119).

For example, the processor 100 may compare the analysis result Zi (Z1, Z2, . . . ) for the individual actions, extract an action having the largest analysis result Zi, and recommend the extracted action as a recommended action. For example, when the analysis result Z1 for the pattern of using the home phone numbers is calculated to be 0.25 and the analysis result Z2 for the pattern of using the cell phone numbers is calculated to be 0.5 as described above, the analysis result Z2 for the pattern of using the cell phone numbers is greater than the analysis result Z1 for the pattern of using the home phone numbers. Therefore, the processor 100 may determine the use of the cell phone number as the recommended action.

Also, the processor 100 may determine, as a recommendation index corresponding to the recommended action, the recommendation results Zi (Z1, Z2, . . . ) for the action determined as the recommended action. For example, when the use of the cell phone numbers is determined as the recommended action, 0.5, which is a value of the analysis result Z2 for the pattern of using the cell phone numbers, may be determined as the recommendation index.

Figure 17:
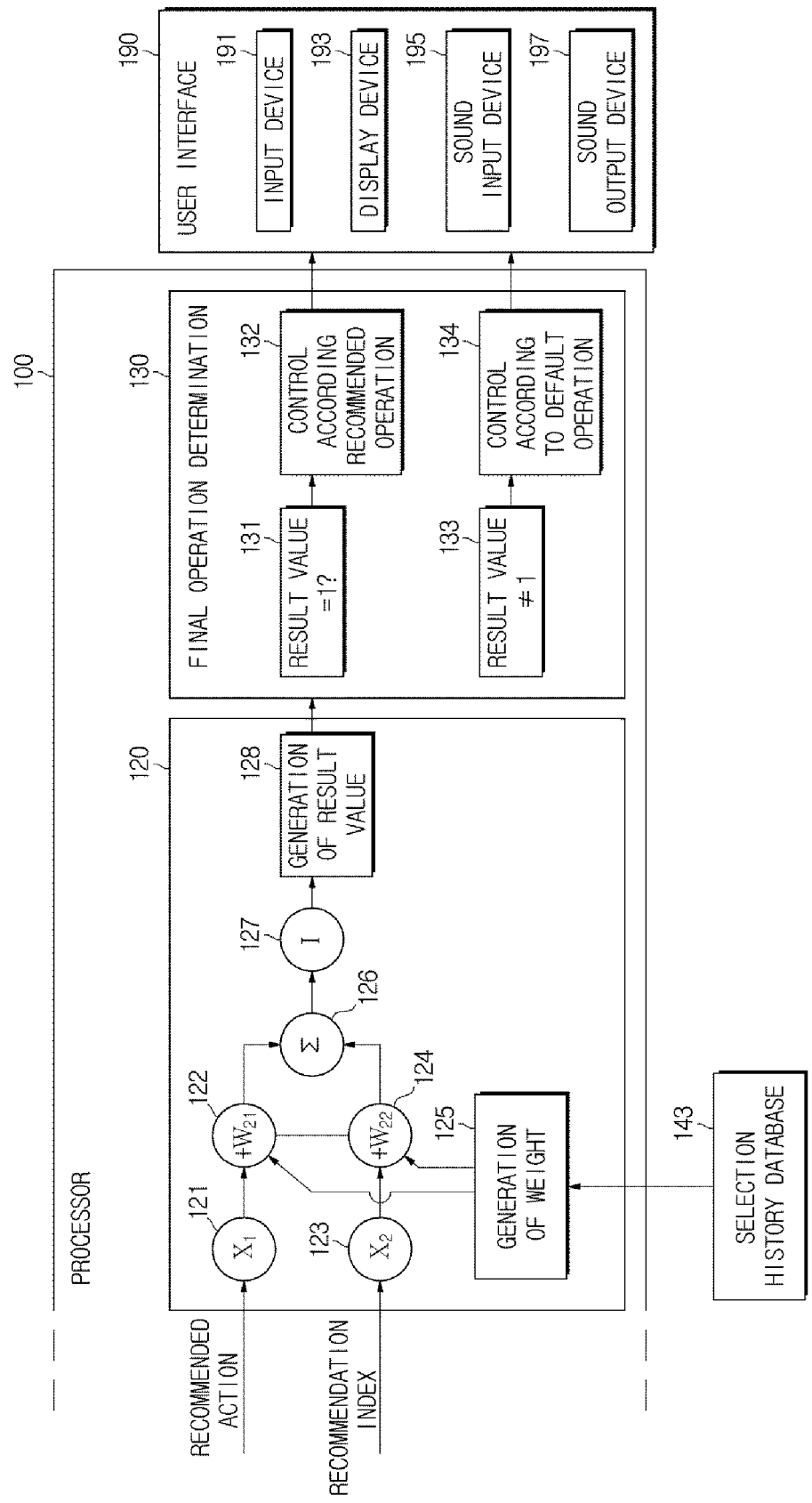
FIG. 17 is a third diagram illustrating an exemplary process performed by a processor

FIG. 17 is a third diagram illustrating an exemplary process performed by a processor.

As shown in FIGS. 15 and 17, the processor 100 may verify the recommended action using the recommendation index (120). In this case, the processor 100 may additionally use a selection history database 143 obtained by accumulating results of a user selecting the recommended action to determine whether the determined recommended action is appropriate in consideration of a selection history for the user.

When the recommended action and the recommendation index are determined, the processor 100 may perform a predefined calculation using the recommended action and the recommendation index and may acquire a predetermined result value X using a result of the calculation in order to verify the recommended action.

According to embodiments of the present disclosure, the processor 100 may determine a calculable first variable x1 and a second calculable variable x2 (121 and 123). The first variable x1 and the second variable x2 correspond to the recommended action and the recommendation index, respectively. Subsequently, the processor may add corresponding weights, that is, a first weight w21 and a second weight w22 to the first variable x1 and the second variable x2 and perform a predefined action on the first variable x1 to which the first weight w21 is applied and the second variable x2 to which the second weight w22 is applied and thus may acquire the a result value X.

When the first variable x1 is determined, the processor 100 may acquire a calculable value corresponding to the recommended action, for example, on the basis of the previous definition and then may determine the acquired value as the first variable x1 to determine the first variable x1 corresponding to the recommended action (121).

When the second variable x2 is determined, the processor 100 may determine the second variable x2, for example, by using the recommendation index or partially modifying the recommendation index (123).

According to embodiments of the present disclosure, the predefined action may include summing the first variable x1 to which the first weight w21 is added and the second variable x2 to which the second weight w22 is added. In other words, the processor 100 may weighted-sum the recommended action (or a value corresponding to the recommended action) and the recommendation index (or a value corresponding to the recommendation index) to acquire the result value X. In this case, the processor 100 may acquire the result value X by using Equation 2 below:

$$X = \Sigma w_m x_m \quad \text{[Equation 2]}$$

In Equation 2, X is a result value acquired by the processor 100, wm is a weight added to each variable, and xm is an $m^{th}$ calculable variable. As described above, m may include 1 and 2 and may include integers greater than or equal to 3 depending on embodiments. For example, when another variable is additionally used to verify the recommended action in addition to the above-described recommended action and recommendation index, m may include values greater than or equal to 3 depending on the number of variables used.

According to embodiments of the present disclosure, the predefined action may include another calculation method in addition to the summing of the first variable x1 to which the first weight w21 is added and the second variable x2 to which the second weight w22 is added. For example, the predefined calculation may be defined by using one or a combination of arithmetic operations. Also, the predefined calculation may be defined by additionally a power or a square root.

The predetermined weights w21 and w22 may be acquired on the basis of records stored in the selection history database 143.

The processor 100 may call a different selection history database DB3 depending on a default action or a recommended action and may determine the predetermined weights w21 and w22 by using the called selection history database DB3.

For example, when the default action is a call origination, the processor 100 uses a selection history database DB3 for the call origination, as shown in FIG. 13. When the default action is a destination search and setting, the processor 100 may use a selection history database 143 for the destination search and setting, as shown in FIG. 9.

When a different selection history database DB3 is called depending on the default action or the recommended action, the processor 100 may create and acquire the weights w21 and w22 using field data stored in records r21 and r22 of the called selection history database DB3. In this case, the processor 100 may use a predefined predetermined model to acquire the weights w21 and w22 or may create a predetermined model using the selection history database 143 to acquire the weights w21 and w22.

According to embodiments of the present disclosure, the processor 100 may change the field data stored in the records r21 and r22 to be calculable by a method or the like of assigning a different numerical value to each action and may perform a regression analysis by using an actual action as a dependent variable and also using the recommended action and the recommendation index as an independent variable to acquire a first weight w21 to be applied to the first variable x1 for the recommended action and a second weight w22 to be applied to the second variable x2 for the recommendation index on the basis of a result of the regression analysis. In this case, coefficients acquired by performing the regression analysis may be determined as the first weight w21 and the second weight w22 with no change or partial modification.

In some cases, the processor 100 may calculate a correlation between the actual action and the recommended action and a correlation between the actual action and the recommendation index and may acquire the first weight w21 to be applied to the first variable x1 for the recommended action and the second weight w22 to be applied to the variable x2 for the recommendation index by using a result of calculating the correlations.

In addition, the processor 100 may determine the weights w21 and w22 using a predetermined algorithm so that an error between a final action and the actual action is minimized. The error may be defined by summing the square of a difference between at least one final action and at least one actual action corresponding to the at least one final action and divide the sum by 2.

According to embodiments of the present disclosure, the predetermined algorithm may include a gradient descent algorithm. In this case, a future weight may be defined as a value obtained by adding a parameter for adjusting a distance to be moved and a variation in weight to a current weight or subtracting the current weight from the parameter and the variation.

Also, the predetermined algorithm may be a learning algorithm. The learning algorithm may include, for example, at least one of a deep neural network (DNN), a convolutional neural network (CNN), a recurrent neural network (RNN), a deep belief network (DBN), and a deep Q-network or an algorithm obtained by partially modifying the network.

Subsequently, the processor 100 may create a verification result value O for verifying the recommended action on the basis of the value X acquired through the summation (128).

According to embodiments of the present disclosure, the processor 100 may determine whether the value X acquired through the summation is larger or smaller than a predefined reference value and create the verification result value O on the basis of a result of the determination (127 and 128). In this case, the processor 100 may acquire the verification result value O using, for example, Equation 3 below:

$$O(X) = \begin{cases} 1 & \text{if } X \geq C_{Ref} \\ 0 & \text{if } X < C_{Ref} \end{cases} \quad \text{[Equation 3]}$$

In Equation 3, O is the verification result value, X is the result value obtained through the result of calculating Equation 2, and Cref is a constant that is predefined by a user or a designer as a reference value.

As described in Equation 3, when the acquired result value X is larger than the predefined value Cref, the processor 100 may determine the verification result value O obtained through the recommended action verification process to be a first value, for example, 1. Conversely, the result value X acquired by the processor 100 is smaller than the predefined value Cref, the processor 100 may determine the verification result value O according to the recommended action verification process to be a second value different from the first value, for example, 0. When the result value X acquired by the processor 100 is the same as the predefined value Cref, the processor 100 may determine the verification result value O according to the recommended action verification process to be any one of the first value and the second value depending on a design of a designer. The first value and the second value may be randomly defined according to a designers or users selection.

When the verification result value O is determined according to the recommended action verification process, as shown in FIGS. 3 and 7, the processor 100 may determine a final action on the basis of the recommended action and the verification result for the recommended action. When a result of performing the determination using the recommended action, the recommendation index, and the selection history database 143 is that the determined recommended action meets, or is likely to meet, a users intent, the processor 100 may determine the determined recommended action as the final action. Conversely, when it is determined that the determined recommended action does not meet, or is less likely to, a users intent, the processor 100 may determine a previously set action as the final action.

According to embodiments of the present disclosure, when the verification result value O according to the recommended action verification process is a first value, for example, 1 (131), the processor 100 may determine the recommended action as the final action (132).

Thus, the processor 100 may determine an appropriate final action according to a reference action corresponding to a command input by a user through his or her manipulation or voice.

For example, when the reference action is a call origination action, the processor 100 may determine a call origination as the final action by using the phone number determined as described above. Also, as another example, according to a reference action corresponding to the command input by the user, the processor 100 may determine, as the final action, at least one of an incoming call reject action, a destination setting action, an action of guiding a set destination, a temperature adjustment action, a message transmission action, an action of converting text included in an email or message into voice, an action of outputting a voice corresponding to text, an action of playing a music or video, an action of displaying a predetermined screen, an action of changing a channel or volume of a radio or television, and various other actions considerable by a designer with respect to the first terminal device 10.

When the final action is determined, the processor 100 may operate such that the first terminal device 10 performs an action corresponding to the determined final action and/or controls each component of the first terminal device in response to the determination of the final action.

According to embodiments of the present disclosure, when the final action is determined, the first terminal device 10 may transmit at least one of the above-described service provision request signal and service provision start request signal to the server device 300 in response to the determination of the final action. In other words, the determination of the final action may be used as a trigger of at least one of a service provision request and a service provision start request.

In some cases, the processor 100 may be set to ask the user whether the first terminal device 10 operate according to the determined final action first before the processor 100 performs the final action according to settings predefined by the user or designer. When the user agrees with the operation of the first terminal device 10 according to the final action, the first terminal device 10 may perform the determined final action. Also, depending on embodiments, the agreement of the user may be used as a trigger of at least one of a service provision request and a service provision start request.

Figure 18:
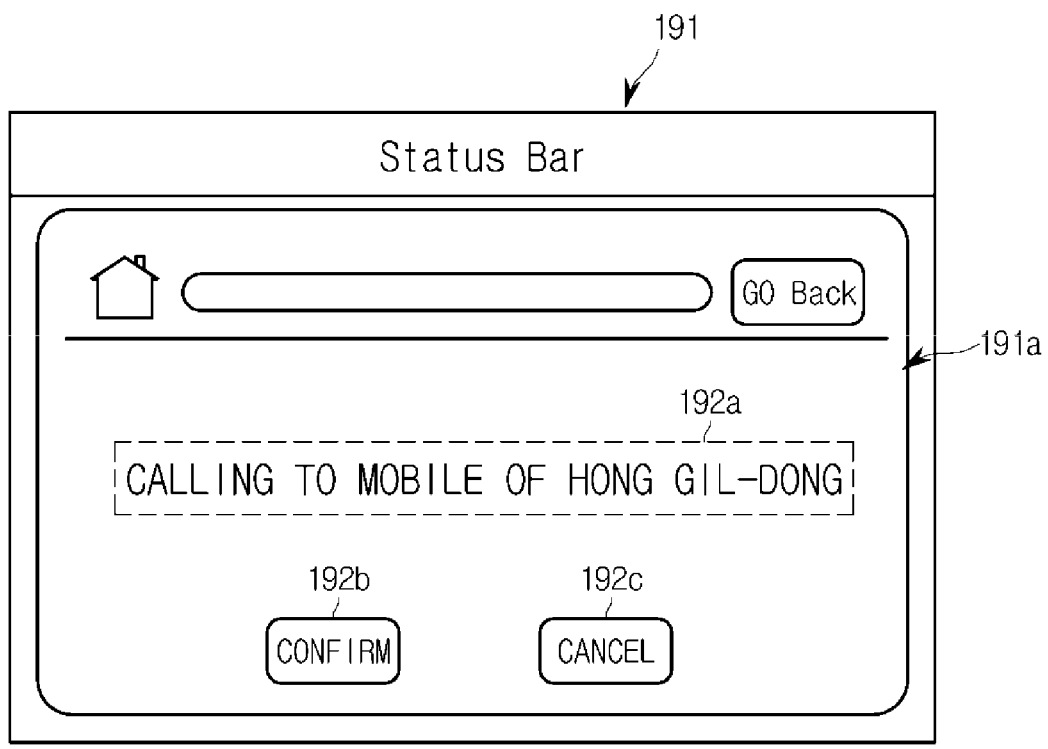
FIG. 18 is a diagram showing an example of a screen on which a recommendation result is displayed.

FIG. 18 is a diagram showing an example of a screen on which a recommendation result is displayed.

According to embodiments of the present disclosure, while performing the final action, the processor 100 may ask the user whether to approve the final action.

For example, the processor 100 may control the display 193 of the user interface 190 so that the display 193 displays a screen 191a for asking whether the final action is approved, as shown in FIG. 18. Information 192a about the final action and predetermined images 192b and 192c for guiding a selection of approval (confirmation) or disapproval (cancellation) of the final action may be displayed on the screen 191a for asking whether the final action is approved. The predetermined images 192b and 192c may be implemented, for example, using an icon or a virtual button.

The user may input a command for selecting any one of the approval and the disapproval by manipulating the input unit 191. The input unit 191 and the display 193 is implemented using a touchscreen, the user may select any one of the displayed images 192b and 192c to input the command for selecting any one of the approval and the disapproval.

When the user approves the operation of the first terminal device 10 according to the final action, the first terminal device 10 operates according to the final action.

Conversely, when the user does not approve the operation of the first terminal device 10 according to the final action, the first terminal device 10 may stop operating according to the determined final action. In this case, the first terminal device 10 may perform a predetermined action according to a previous definition. For example, the first terminal device 10 may perform a default action as described below.

When the default action is performed, the display 193 of the first terminal device 10 may display a screen 191b including a plurality of options 192d1 and 192d2 (see FIG. 9) as described below. The first terminal device 10 may perform a desired action by the user selecting any one of the plurality of options 192d1 and 192d2 through the input unit 191.

When a certain time elapses after the user does not select any one of the plurality of options 192d1 and 192d2, the processor 100 may end the context-based action determination process and stop the above-described service provision or service provision start process.

According to embodiments of the present disclosure, when the user approves or does not approve the operation of the first terminal device 10 according to the final action, the processor 100 may update the selection history database 143 in response to the approval and/or disapproval of the operation (135), as shown in FIG. 3.

In detail, the processor 100 may additionally create records having the acquired recommended action and recommendation index and the final action corresponding to the approval and/or disapproval of the user as field data in the selection history database 143. Depending on embodiments, the processor 100 may be designed to update the selection history database 143 only when the user does not approve the final action (135).

Figure 19:
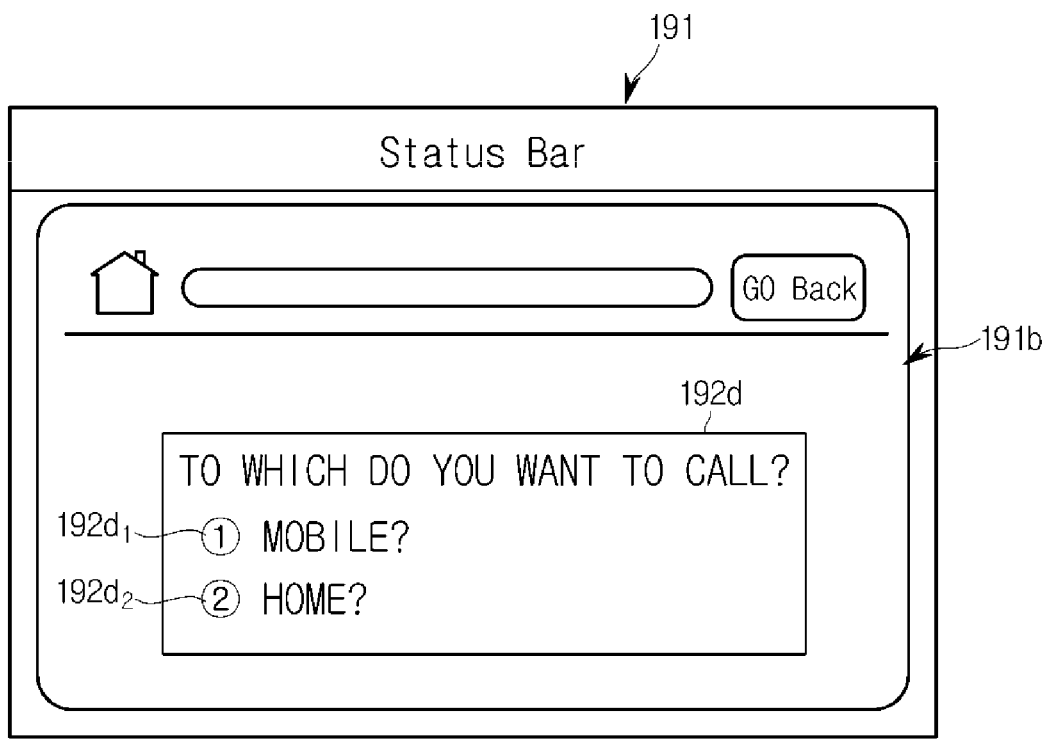
FIG. 19 is a diagram showing an example of a screen displayed when a result of recommendation is not displayed.

FIG. 19 is a diagram showing an example of a screen displayed when a result of recommendation is not displayed.

According to embodiments of the present disclosure, when the verification result value O according to the recommended action verification process is not a first value, for example, 1 (133), the processor 100 does not have to determine the recommended action as the final action, but may determine another defined action, for example, the default action as the final action (132). When the verification result value O according to the recommended action verification process is not a first value, the verification result value O according to the recommended action verification process may be a second value, for example, 0.

The default action may include a display action of the default screen 191b performed by the display 193, as shown in FIG. 19.

In detail, the processor 100 may control the display 193 to display the default screen 191b in response to a result of determining that the verification result value O according to the recommended action verification process is not 1. The default screen 191b may include a plurality of options 192d1 and 192d12. As necessary, the processor 100 may display at least one of the options 192d1 and 192d2 on the screen 191b by displaying a predetermined window 192d on the screen 191b.

The at least one of the options 192d1 and 192d2 may indicate various actions performable by the first terminal device 10, for example, a call using a cell phone number, a call using a home phone number, and/or a call using an office phone number.

By the user selecting any one of the options 192d1 and 192d2, the first terminal device 10 may operate according to the user's intent.

In certain cases, the user's selection may or may not be used as a trigger of at least one of a service provision request and a service provision start request according to a previous definition.

For example, when a phone number corresponding to the selected option 192d1 or 192d2 corresponds to a partner capable of participating in the above-described service, the user's selection may be used as a trigger of at least one of the service provision request and the service provision start request. As another example, when a phone number corresponding to the selected option 192d1 or 192d2 corresponds to a partner not capable of participating in the above-described service, the user's selection may not be used as a trigger of the service provision request and the service provision start request.

Also, when a certain period of time has elapsed while the user selects none of the plurality of options 192d1 and 192d2, the processor 100 may end the context-based action determination process, and the first terminal device 10 may ignore a command input by the user through at least one of the input unit 191 and the sound input unit 195 and may not perform an action corresponding to the users command. In this case, the service is not provided.

Several embodiments of the context-based action determination method will be described below.

Figure 20:
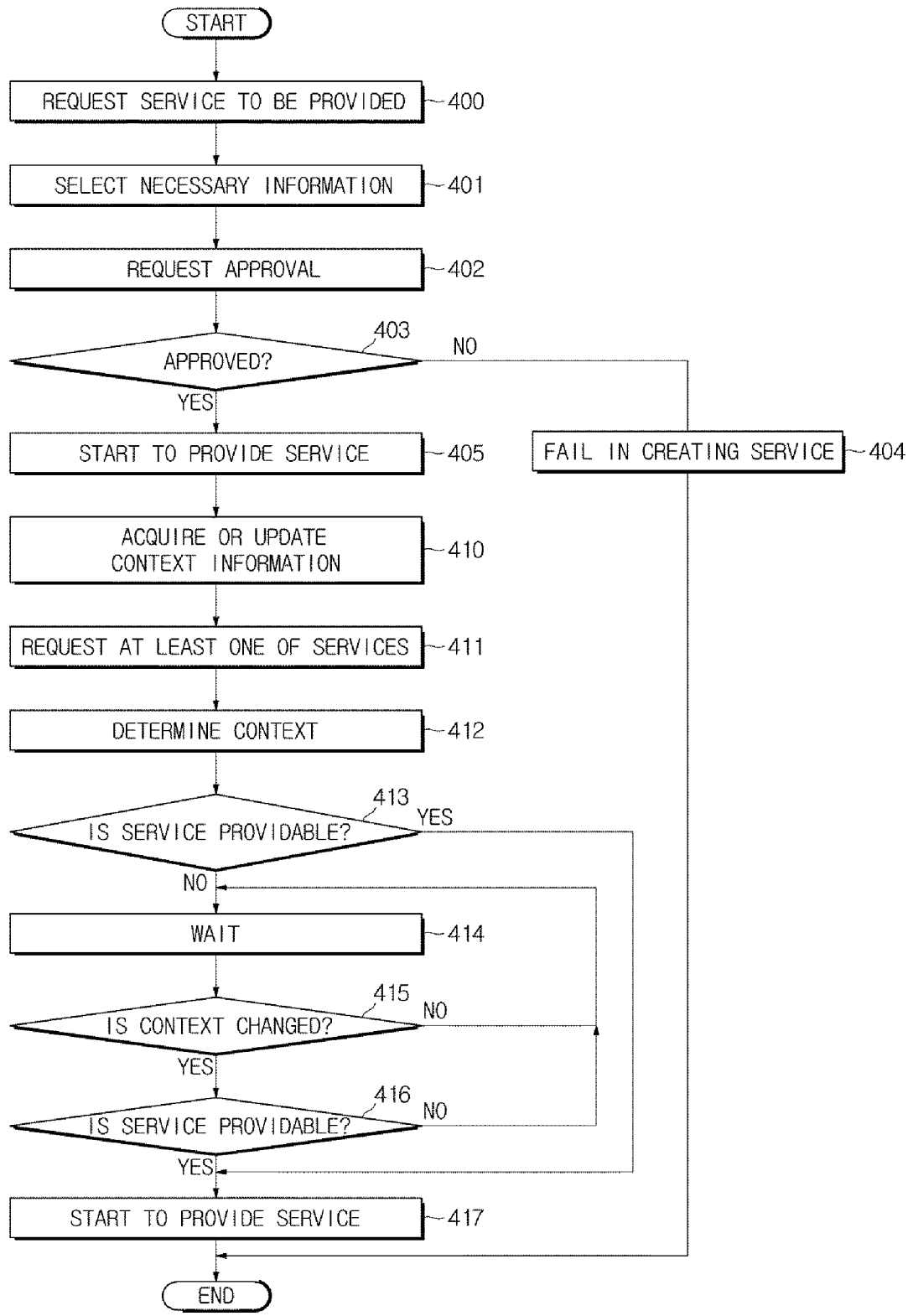
FIG. 20 is a flowchart of an exemplary context-based action determination method according to embodiments of the present disclosure.

FIG. 20 is a flowchart of an exemplary context-based action determination method according to embodiments of the present disclosure.

As shown in FIG. 20, a service provision start request may be transferred from a first terminal device to a server device according to a predetermined trigger (400). In this case, the trigger may include at least one of a user manipulating an input unit, inputting a voice command, and determining a final action.

When the service provision start request is received, the server device selects necessary information corresponding to a service requested to be provided (401). Here, the necessary information may include information to be acquired from at least one of a first terminal device and a second terminal device in order to perform the service.

According to a requirement or setting by a user of the first terminal device, the server device may transmit an approval request to at least another terminal device, for example, the second terminal device (402). In this case, a transmission request for service required information and information corresponding to the service required information may be transmitted to the second terminal device in addition to an approval request signal.

The server device waits until an approval signal or a rejection signal is transferred from the second terminal device.

When a user of the second terminal device does not approve and thus a rejection signal is transferred to the server device (no in 403), the server device determines that the service is not providable and handles that service creation failed (404). As necessary, a rejection guidance message may be transmitted from the server device to the first terminal device.

When the user of the second terminal device approves and thus the server device receives an approval signal (yes in 403), the server device determines that the service is providable and starts to provide the service to at least one of the first terminal device and the second terminal device (405). As necessary, the server device may transmit a signal indicating that the service may be provided to the first terminal device.

Subsequently, the server device transmits a request for providing or updating context information to at least one of the first terminal device and the second terminal device, receives the context information from at least one of the first terminal device and the second terminal device, and stores or updates the context information.

When the server device receives a request for providing at least one of a plurality of providable services from at least one of the first terminal device and the second terminal device (411), the server device may determine a context of at least one of the first terminal device, the user of the first terminal device, the second terminal device, and the user of the second terminal device in response to a request for providing the service by at least one of the first terminal device and the second terminal device (412 and 413).

When it is determined that the service is providable, (yes in 413), the server device provides the service to at least one of the first terminal device and the second terminal device (417).

Conversely, when it is determined that the service is not providable (no in 413), the server device may transmit a guidance message indicating that the service is not providable to at least one of the first terminal device and the second terminal device. According to preset settings, the server device may stop an action associated to the service provision or may wait until the service becomes providable (414).

When the context information stored in the server device is updated by the context information transferred from at least one of the first terminal device and the second terminal device, and thus the context is changed (yes in 415), the server device may determine that the service is providable again.

When the service is providable, the server device starts to provide the service (417). Conversely, when the service is not providable, the server device stops an action associated with the service provision or wait until the service becomes providable (414).

As one of detailed embodiments of the context-based action determination method, a first embodiment of a service associated with a call origination will be described with reference to FIG. 21.

Figure 21:
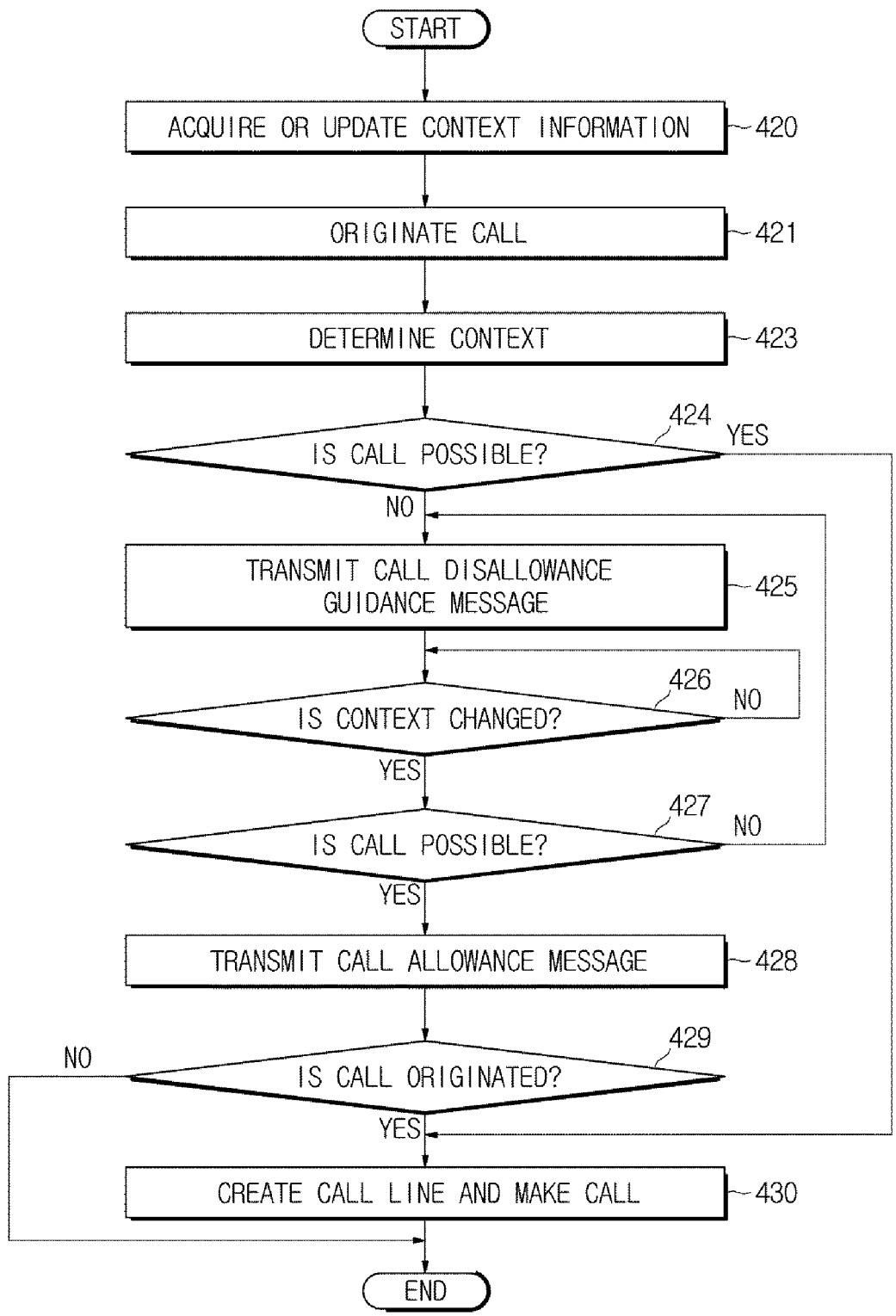
FIG. 21 is a flowchart of a first detailed example of the context-based action determination method according to embodiments of the present disclosure.

FIG. 21 is a flowchart of a first detailed example of the context-based action determination method according to embodiments of the present disclosure.

As shown in FIG. 21, the server device receives and acquires context information from at least one of the first terminal device and the second terminal device and updates the context information stored in the storage (420).

Subsequently, when at least one of the first terminal device and the second terminal device originates a call (421), the service starts to be provided. Thus, the server device may determine a context of at least one of the first terminal device, the user of the first terminal device, the second terminal device, and the user of the second terminal device (423 and 424).

When the context determination result is that the call is possible (yes in 424), the server device creates a call line to enable communication between the first terminal device and the second terminal device (430).

Conversely, when the context determination result is that the call is impossible (no in 424), the server device may determine that the call is impossible and may transfer a call disallowance guidance message to at least one of the first terminal device and the second terminal device, as necessary (425). The call disallowance guidance message may include a fact that the call is impossible. As necessary, the call disallowance guidance message may further include at least one piece of information such as a time at which the call is predicted to be possible.

Subsequently, when it is determined that the context is changed according to the context information transferred from at least one of the first terminal device and the second terminal device (yes in 426), and it is determined that the call is possible according to the changed context (yes in 427), the server device may transmit a message indicating that the call is possible to at least one of the first terminal device and the second terminal device (428). When it is determined that the context is not changed (no in 426) or the call is impossible (no in 427), the server device may transmit the call disallowance guidance message to at least one of the first terminal device and the second terminal device, as necessary (425) and may continue to wait. It will be appreciated that, depending on embodiments, the server device may stop the service provision action.

When a call is originated from at least one of the first terminal device and the second terminal device after it is determined that the call is possible (yes in 429), the server device operates such that the first terminal device and the second terminal device may communicate with each other (430). When the call is not originated by at least one of the first terminal device and the second terminal device (no in 429), the server device may end the service provision action according to a previous definition.

As one of detailed embodiments of the context-based action determination method, a first embodiment of a service associated with a schedule setting will be described with reference to FIGS. 22 and 23.

Figure 22:
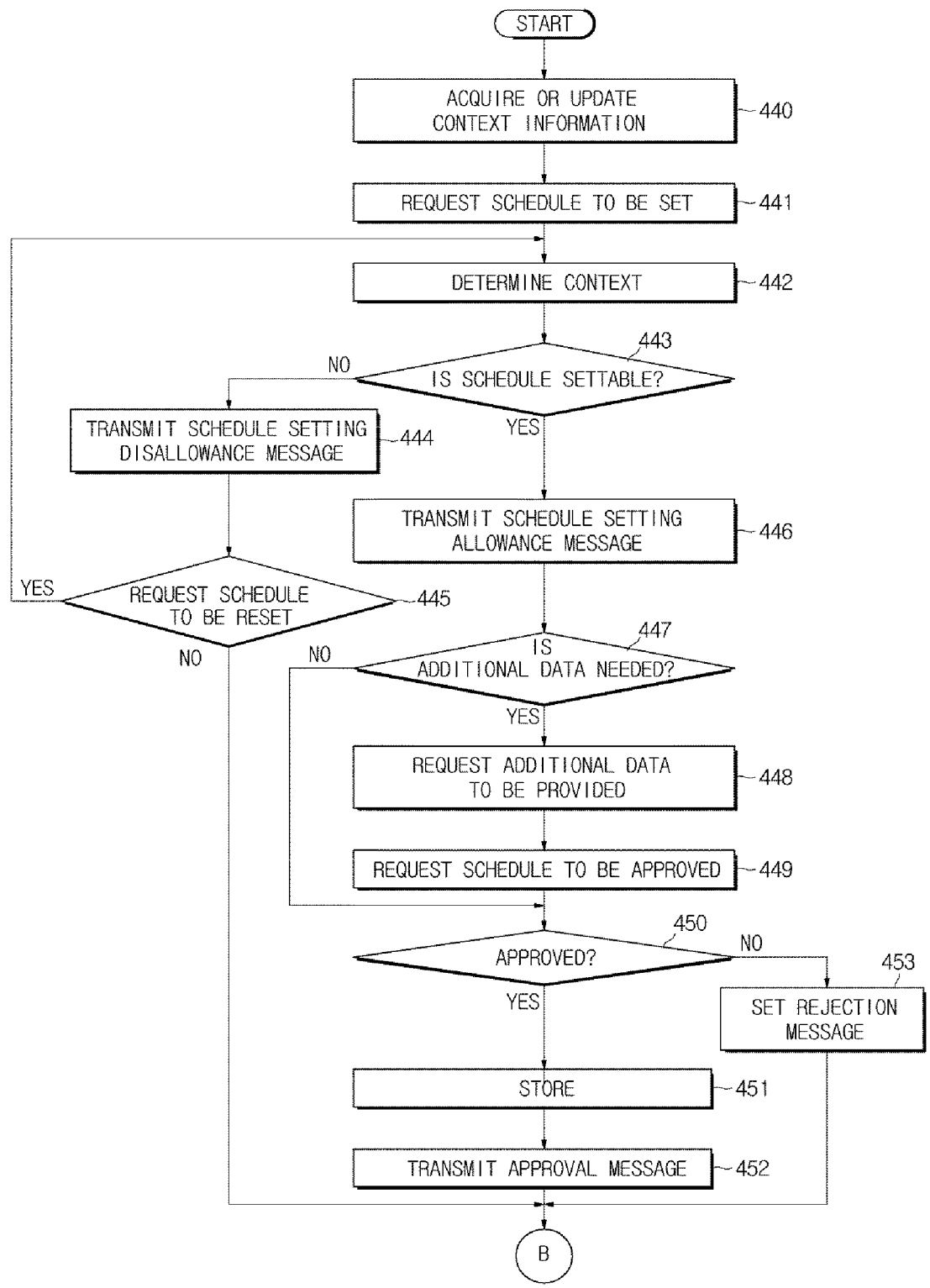
FIG. 22 is a first flowchart of a second detailed example of the context-based action determination method according to embodiments of the present disclosure.
Figure 23:
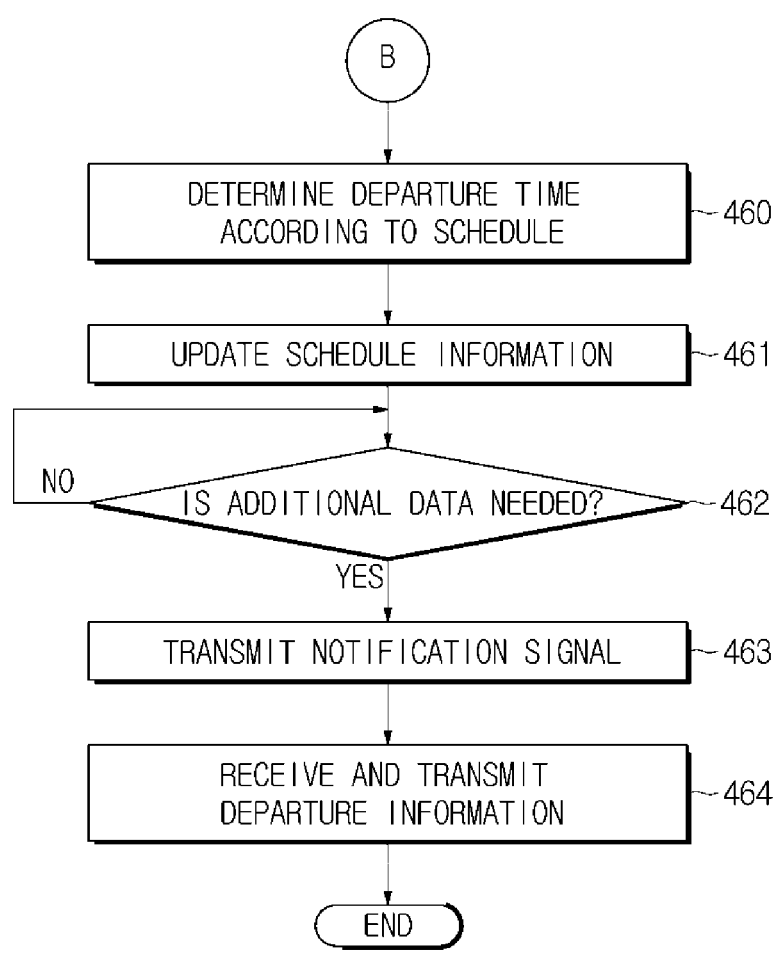
FIG. 23 is a second flowchart of the second detailed example of the context-based action determination method according to embodiments of the present disclosure.

FIG. 22 is a first flowchart of a second detailed example of the context-based action determination method according to embodiments of the present disclosure, and FIG. 23 is a second flowchart of the second detailed example of the context-based action determination method according to embodiments of the present disclosure.

As shown in FIGS. 22 and 23, the server device may receive and acquire context information from at least one of the first terminal device and the second terminal device and may update the context information stored in the storage, as described above (440).

When a schedule setting request is received from at least one of the first terminal device and the second terminal device (441), the server device determines the context on the basis of context information regarding at least one of the first terminal device and the second terminal device in response to the schedule setting request (442) and determines whether the schedule is settable (442 and 443). A schedule creation request may include information needed for the schedule setting. In detail, the schedule creation request may include information regarding at least one of a desired time, a desired place, and a desired partner.

When the schedule is not settable, the server device transmits a schedule setting disallowance guidance message to at least one of the first terminal device and the second terminal device (444).

When the server device receives a schedule resetting request signal from at least one of the first terminal device and the second terminal device (yes in 445), the server device sequentially determines the context and then determines whether the schedule is settable (442 and 443). Here, the schedule resetting request may include information needed to set a modified schedule. The information needed to set the modified schedule denotes information obtained by modifying at least one of a time, a place, and a partner in the information needed to the schedule setting.

When the server device does not receive the schedule resetting request signal from at least one of the first terminal device and the second terminal device (no in 445), the server device may stop the service provision action according to previous settings.

When it is determined that the schedule is settable (yes in 443), the server device may set the schedule according to previous settings.

In this case, for example, the server device may transmit a message indicating that the schedule is settable to at least one of the first terminal device and the second terminal device first (446).

When additional data is additionally needed to set the schedule (yes in 447), the server device may request that at least one of the first terminal device and the second terminal device provide the additional data (448).

After transmitting the message indicating the schedule is settable to at least one of the first terminal device and the second terminal device or after receiving the additional data from at least one of the first terminal device and the second terminal device, the server device may transmit a schedule approval request to at least one of the first terminal device and the second terminal device (449). In this case, when the schedule setting request is transmitted from the first terminal device, the server device transmits the schedule approval request to the second terminal device. Conversely, when the schedule setting request is transmitted from the second terminal device, the server device transmits the schedule approval request to the first terminal device.

When the server device receives a signal corresponding to an approval of the schedule from at least one of the first terminal device and the second terminal device in response to the transmission of the schedule approval request to at least one of the first terminal device and the second terminal device (yes in 450), the server device may set and store the schedule (451) and may transmit a message indicating that the schedule is approved to at least one of the first terminal device and the second terminal device, as necessary (452).

Conversely, when the server device receives a signal corresponding to a rejection of the schedule from at least one of the first terminal device and the second terminal device in response to the transmission of the schedule approval request to at least one of the first terminal device and the second terminal device (no in 450), the server device may stops the schedule setting action and may create an approval rejection guidance message for guiding a fact that the approval is rejected and transmit the created approval rejection guidance message to at least one of the first terminal device and the second terminal device, as necessary (453).

When the schedule is set and stored through the above process (451), the server device may further provide a service additionally associated with the schedule.

In detail, referring to FIG. 23, the server device may determine a departure request signal of at least one of the user of the first terminal device and the user of the second terminal user according to the schedule (460). The departure request signal may be calculated using a traveling time from a location of at least one of the first terminal device and the second terminal device to a set place (i.e., a destination) and a time set in the schedule. To this end, the server device may acquire information regarding the location of at least one of the first terminal device and the second terminal device, set a distance or route between the acquired location and the place, acquire the time on the basis of the distance or route, and determine the departure request time. The determination of the departure request time may be performed by at least one of the first terminal device and the second terminal device.

The departure request signal or the like may be reflected in the predefined schedule, and thus information regarding the schedule may be updated (461).

When the set time, a time before a certain period from the set time, and/or the departure request time has arrived (yes in 462), the server device may transmit a notification signal to at least one of the first terminal device and the second terminal device (463).

Also, as necessary, the server device may receive a signal regarding whether he or she has departed from at least one of the first terminal device and the second terminal device and may monitor whether at least one of the user of the first terminal device and the user of the second terminal device has departed (464). When at least one of the user of the first terminal device and the user of the second terminal device departs to a set place, departure information is transmitted to at least one of the first terminal device and the second terminal device. Thus, at least one of the user of the first terminal device and the user of the second terminal device may be appropriately aware of whether the other has departed.

In certain cases, at least one of the first terminal device and the second terminal device may be paired with at least one a vehicle and a navigation device installed in the vehicle. In this case, information regarding the installation place may be transferred from at least one of the first terminal device and the second terminal device to at least one of the vehicle and the navigation device, and the vehicle and the navigation device may set a destination on the basis of the transferred information regarding the installation place.

As described above, the determination of the final action may be used as a trigger of the service provision or the service provision start. An embodiment of the context-based action determination method including determining the final action and providing the service will be described below with reference to FIG. 24.

Figure 24:
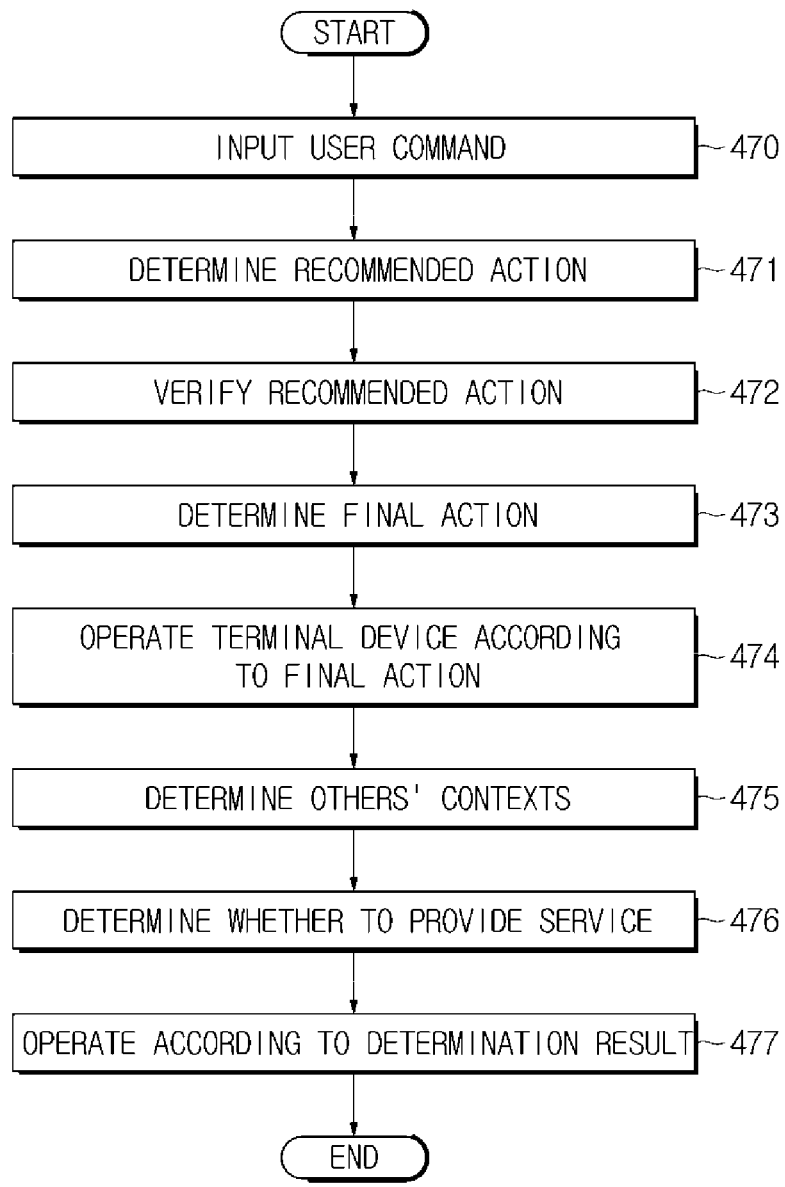
FIG. 24 is a flowchart of a third detailed example of the context-based action determination method according to embodiments of the present disclosure.

FIG. 24 is a flowchart of a third detailed example of the context-based action determination method according to embodiments of the present disclosure.

As shown in FIG. 24, first, the user may input a user command to the terminal device by using his or her voice or by manipulating a predetermined input device (470).

In this case, as described above, the terminal device may determine a recommended action corresponding to the user command by using a context recognition database and context information regarding at least one of the user of the terminal device and an environment surrounding the terminal device (471).

Subsequently, the terminal device may verify the recommended action by using a selection history database (472).

When a result of verifying the recommended action is that the recommended action is appropriate, the terminal device may determine the recommended action as a final action. When the recommended action is not appropriate, the terminal device may determine a default action as the final action according to a previous definition (473).

When the final action is determined, the terminal device starts operating according to the final action (474). As necessary, the terminal device may receive the user's approval with respect to the final action before or after performing the final action.

In this case, the determination of the final action, the approval of the user, and/or the operation of the terminal device may be used as a trigger of the service provision or the service provision start.

Thus, the terminal device transmits a request signal for providing a service corresponding to the final action to the server device, and the server device determines a context of at least one of a partner corresponding to a service provision request signal and a terminal device of the partner in response to the transmission (475).

The server device may determine whether to provide the service according to the context determination result for at least one of the partner and the terminal device of the partner (476), and the server device may perform the above-described action on the basis of a result of determining whether to provide the service (477).

The above-described context-based action determination method may be applicable to a control method for the terminal device, a control method for the server device, or a control method for a vehicle with no change or partial modification.

According to the above-described embodiments, it is possible to determine an appropriate service or at least one action that matches a user's requirement and another person's context on the basis of the other person's context, thus enabling the user to receive a service and action matching the context.

Furthermore, when an action in which a plurality of users are participating is performed, it is possible to appropriately adjust a scenario of the action depending on a current context of each of the users, thus improving convenience of the plurality of users.

Even further, it is possible for a user to quickly determine a context of another user, thereby reducing the user's inconvenience and thus increasing the user's satisfaction.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A context-based action determination system comprising:
    a first terminal device;
    a server device communicably connected with the first terminal device and configured to receive a service provision request from the first terminal device; and
    a second terminal device, different from the first terminal device, communicably connected with the server device and configured to transmit context information to the server device, wherein
    the server device determines whether a service associated with the service provision request is providable to the first terminal device in response to the service provision request based on the context information received from the second terminal device, and
    the server device provides the service to the first terminal device when the server device determines that the service is providable,
    wherein the first terminal device determines a recommended action and a recommendation index corresponding to the recommended action using a context recognition database and the context information, verifies the recommended action using a selection history database, and determines a final action according to a result of the verification,
    wherein, when the server device determines that the service is not providable, the server device transmits a guidance message to the first terminal device indicating that the service is not providable, and
    wherein the second terminal re-transmits the context information to the server device, and the server device receives the re-transmitted context information from the second terminal device and re-determines whether the service is providable based on the re-transmitted the context information.

2. The context-based action determination system of claim 1, wherein:
    the first terminal device transmits a service provision start request to the server device, and
    in response to receiving the service provision start request, the server device determines information needed for the service according to the service provision start request and transmits an approval request to the second terminal device.

3. The context-based action determination system of claim 1, wherein the server device transmits an update request for the context information to the second terminal device.

4. The context-based action determination system of claim 1, wherein, when the server device re-determines that the service is providable, the server device provides the service to the first terminal device or transmits a guidance message indicating that the service is providable to the first terminal device.

5. The context-based action determination system of claim 1, wherein the server device receives a new service provision request from the first terminal device when the server device determines that the service is not providable.

6. The context-based action determination system of claim 1, wherein:
    the server device transmits an additional information transmission request to the first terminal device, and
    in response to receiving the additional information transmission request, the first terminal device transmits additional information indicated by the additional information transmission request to the server device.

7. The context-based action determination system of claim 1, wherein, when the service includes setting a schedule, the server device transmits a notification signal to at least one of the first terminal device and the second terminal device when a time according to the schedule has arrived.

8. A context-based action determination method comprising:
    receiving, at a server device, a service provision request from a first terminal device;
    determining, by the server device, a recommended action and a recommendation index corresponding to the recommended action using a context recognition database and the context information;
    verifying, by the server device, the recommended action using a selection history database;
    determining, by the server device, a final action according to a result of the verification;
    receiving, at the server device, context information from a second terminal device different from the first terminal device;
    determining, by the server device, whether a service associated with the service provision request is providable to the first terminal device in response to the service provision request based on the context information received from the second terminal device; and
    providing, by the server device, the service to the first terminal device when the server device determines that the service is providable,
    wherein, when the server device determines that the service is not providable, transmitting, by the server device, a guidance message to the first terminal device indicating that the service is not providable, and
    wherein the method further includes
    receiving, at the server device, the context information from the second terminal device a second time; and
    re-determining, by the server device, whether the service is providable on the basis of the context information received the second time.

9. The context-based action determination method of claim 8, further comprising:
    receiving, at the server device, a service provision start request;

determining, by the server device, information needed for the service according to the service provision start request; and transmitting, by the server device, an approval request to the second terminal device.

10. The context-based action determination method of claim 8, further comprising transmitting, by the server device, an update request for the context information to the second terminal device.

11. The context-based action determination method of claim 10, further comprising at least one of:

providing, by the server device, the service to the first terminal device when the server device re-determines that the service is providable; and transmitting, by the server device, a guidance message to the first terminal device indicating that the service is providable when the server device re-determines that the service is providable.

12. The context-based action determination method of claim 10, further comprising receiving, at the server device, a new service provision request from the first terminal device when the server device determines that the service is not providable.

13. The context-based action determination method of claim 8, further comprising:

transmitting, by the server device, an additional information transmission request to the first terminal device; and receiving, by the server device, additional information indicated by the additional information transmission request from the first terminal device.

14. The context-based action determination method of claim 8, further comprising when the service includes setting a schedule, transmitting, by the server device, a notification signal to at least one of the first terminal device and the second terminal device when a time according to the schedule has arrived.

15. A vehicle comprising:

a communicator communicable with an external device; and a processor configured to determine a recommended action and a recommendation index corresponding to the recommended action using a context recognition database and context information, verify the recommended action using a selection history database, and determine a final action according to a result of the verification, wherein the communicator transmits a service provision request associated with the service provision request to the external device and receives information related to the service from the external device in response to the determined final action, wherein, when the external device determines that the service is not providable, the external device transmits a guidance message to the first terminal device indicating that the service is not providable, and wherein the processor re-transmits the context information to the external device, and the external device receives the re-transmitted context information from the processor and re-determines whether the service is providable based on the re-transmitted the context information.

16. The vehicle of claim 15, wherein the external device determines whether the service is providable to the vehicle in response to the service provision request based on context information received from a second terminal device and provides the service to the vehicle when the external device determines that the service is providable.

* * * * *